(12) United States Patent
Phogat et al.

(10) Patent No.: US 10,943,375 B2
(45) Date of Patent: Mar. 9, 2021

(54) MULTI-STATE VECTOR GRAPHICS

(71) Applicant: Adobe Inc., San Jose, CA (US)

(72) Inventors: Ankit Phogat, Noida (IN); Vineet Batra, Pitam Pura (IN); Mansi Nagpal, Noida (IN)

(73) Assignee: Adobe Inc., San Jose, CA (US)

( * ) Notice: Subject to any disclaimer, the term of this patent is extended or adjusted under 35 U.S.C. 154(b) by 18 days.

(21) Appl. No.: 16/387,186

(22) Filed: Apr. 17, 2019

(65) Prior Publication Data

US 2020/0334874 A1    Oct. 22, 2020

(51) Int. Cl.
| | |
|---|---|
| G06T 11/20 | (2006.01) |
| G06F 3/0484 | (2013.01) |
| G06T 11/60 | (2006.01) |
| G06T 11/00 | (2006.01) |

(52) U.S. Cl.
CPC ........ G06T 11/203 (2013.01); G06F 3/04845 (2013.01); G06T 11/001 (2013.01); G06T 11/60 (2013.01)

(58) Field of Classification Search
None
See application file for complete search history.

(56) References Cited

U.S. PATENT DOCUMENTS

| | | |
|---|---|---|
| 5,611,036 A | 3/1997 | Berend et al. |
| 5,861,889 A | 1/1999 | Wallace et al. |
| 5,894,310 A | 4/1999 | Arsenault et al. |
| 6,154,221 A | 11/2000 | Gangnet |
| 6,268,871 B1 | 7/2001 | Rice et al. |
| 6,441,823 B1 | 8/2002 | Ananya |
| 6,448,964 B1 | 9/2002 | Isaacs et al. |
| 6,781,597 B1 | 8/2004 | Vrobel et al. |

(Continued)

FOREIGN PATENT DOCUMENTS

EP    2530623    12/2012

OTHER PUBLICATIONS

"Adobe Illustrator CC Tutorials", Retrieved at: https://helpx.adobe.com/in/illustrator/how-to/dynamic-symbols.html—on Jan. 8, 2019, 8 pages.

(Continued)

*Primary Examiner* — Yanna Wu
(74) *Attorney, Agent, or Firm* — Fig. 1 Patents

(57) ABSTRACT

Generation of a multi-state symbol from an input graphic object is described. A multi-state graphic symbol system generates an outline and a base mesh for a graphic object. The multi-state graphic symbol system then defines graphic manipulation handles relative to the base mesh and deforms the base mesh by altering a state of the handles. Vectors describing initial positions and final positions of the handles are generated and stored with the outline and base mesh to define the graphic object's multi-state symbol. Additional poses can be generated by adding and/or modifying other handles, and each additional pose is stored as a vector in the multi-state symbol. Additional poses of the graphic object can be generated by interpolating between different vectors of the multi-state symbol. The multi-state graphic symbol system additionally enables for an interpolated pose to be generated based on separate user-defined paths for different handles of the multi-state symbol.

20 Claims, 11 Drawing Sheets

(56) References Cited

U.S. PATENT DOCUMENTS

| | | | |
|---|---|---|---|
| 6,919,888 B1 * | 7/2005 | Perani | G06T 17/20 |
| | | | 345/420 |
| 7,196,707 B2 | 3/2007 | Davignon | |
| 7,218,326 B1 | 5/2007 | Bogues et al. | |
| 7,302,650 B1 | 11/2007 | Allyn et al. | |
| 7,496,416 B2 | 2/2009 | Ferguson et al. | |
| 7,868,887 B1 | 1/2011 | Yhann | |
| 7,884,834 B2 | 2/2011 | Mouilleseaux et al. | |
| 8,004,539 B2 | 8/2011 | McDaniel et al. | |
| 8,373,704 B1 | 2/2013 | Mueller | |
| 8,629,871 B2 | 1/2014 | O'Brien et al. | |
| 8,830,226 B2 | 9/2014 | Goossens | |
| 8,994,736 B2 | 3/2015 | Carr et al. | |
| 9,024,938 B2 | 5/2015 | Joshi | |
| 9,454,797 B2 | 9/2016 | Popovic et al. | |
| 10,388,045 B2 | 8/2019 | Batra et al. | |
| 10,410,317 B1 | 9/2019 | Phogat et al. | |
| 10,510,186 B2 | 12/2019 | Batra et al. | |
| 10,832,446 B2 | 11/2020 | Phogat et al. | |
| 2003/0033050 A1 | 2/2003 | Yutkowitz | |
| 2005/0237325 A1 | 10/2005 | Motter et al. | |
| 2007/0038421 A1 | 2/2007 | Hu et al. | |
| 2009/0213143 A1 | 8/2009 | Igarashi | |
| 2010/0189362 A1 | 7/2010 | Jakubiak et al. | |
| 2010/0214312 A1 * | 8/2010 | Weber | G06T 13/80 |
| | | | 345/593 |
| 2012/0154397 A1 | 6/2012 | Chernikov et al. | |
| 2013/0120457 A1 | 5/2013 | Popovic et al. | |
| 2013/0300736 A1 | 11/2013 | Schmidt | |
| 2014/0104266 A1 | 4/2014 | Stone et al. | |
| 2014/0168270 A1 | 6/2014 | Choy et al. | |
| 2015/0022517 A1 | 1/2015 | Jutan et al. | |
| 2015/0287210 A1 | 10/2015 | Song et al. | |
| 2018/0040169 A1 | 2/2018 | Nakagawa | |
| 2018/0061092 A1 | 3/2018 | Sasikumar et al. | |
| 2018/0061093 A1 | 3/2018 | Ning | |
| 2019/0197771 A1 | 6/2019 | Batra et al. | |
| 2019/0206100 A1 | 7/2019 | Batra et al. | |
| 2019/0279406 A1 | 9/2019 | Batra et al. | |
| 2019/0295217 A1 | 9/2019 | Phogat et al. | |
| 2019/0318523 A1 | 10/2019 | Higginbottom | |
| 2020/0066038 A1 | 2/2020 | Batra et al. | |
| 2020/0219287 A1 | 7/2020 | Phogat et al. | |

OTHER PUBLICATIONS

"Barycentric coordinate system—Wikipedia", https://en.wikipedia.org/wiki/Barycentric_coordinate_system—Retrieved on Oct. 11, 2017, 9 pages.

"Bounding volume hierarchy—Wikipedia", https://en.wikipedia.org/wiki/Bounding_volume_hierarchy—Retrieved on Oct. 11, 2017, 3 pages.

"First Action Interview Office Action", U.S. Appl. No. 15/852,924, dated Oct. 11, 2018, 5 pages.

"First Action Interview Office Action", U.S. Appl. No. 15/936,299, dated Jan. 18, 2019, 4 pages.

"Kabsch algorithm—Wikipedia", Retrieved at: https://en.wikipedia.org/wiki/Kabsch_algorithm—Sep. 27, 2017, 4 pages.

"Notice of Allowance", U.S. Appl. No. 15/861,908, dated Apr. 3, 2019, 14 pages.

"Pre-Interview First Office Action", U.S. Appl. No. 15/852,924, dated Jul. 27, 2018, 4 pages.

"Pre-Interview First Office Action", U.S. Appl. No. 15/861,908, dated Jan. 18, 2019, 22 pages.

"Pre-Interview First Office Action", U.S. Appl. No. 15/936,299, dated Sep. 21, 2018, 4 pages.

"Ramer-Douglas-Peucker algorithm—Wikipedia", https://en.wikipedia.org/wiki/Ramer%E2%80%93Douglas%E2%80%93Peucker_algorithm—Retrieved on Oct. 11, 2017, 4 pages.

Au, "Skeleton Extraction by Mesh Contraction", ACM Trans. Graph., 27(3):44:1{44: 10,, Aug. 2008, 10 pages.

Batra, "Digital Media Environment for Intuitive Modifications of Digital Graphics", U.S. Appl. No. 15/852,924, filed Dec. 22, 2017, 60 pages.

Batra, "Generating a Triangle Mesh for an Image Represented by Curves", U.S. Appl. No. 15/861,908, filed Jan. 4, 2018, 80 pages.

Boye, "A Vectorial Solver for Free-form Vector Gradient", ACM Trans. Graph. 31, 6, Article 173, Sep. 17, 2012, 10 pages.

De "Vector Field Processing on Triangle Meshes", In SIGGRAPH Asia 2015 Courses (SA '15), Nov. 2, 2015, 49 pages.

Igarashi, "As-Rigid-As-Possible Shape Manipulation", ACM Transactions on Graphics 2005, Aug. 2005, 1134-1141.

Jacobson, "Bounded Biharmonic Weights for Real-Time Deformation", In ACM SIGGRAPH 2011 Papers, SIGGRAPH '11, Jul. 2011, 8 pages.

Jacobson, "Fast Automatic Skinning Transformations", ACM Trans. Graph. 31,, Jul. 2012, 10 pages.

Komerska, "Haptic Gdraw: A fun and Easy to Use 3D Haptically Enhanced Sculpting Program", EuroHaptics 2004, Jun. 2004, 6 pages.

Liu, "Skinning Cubic B'ezier Splines and Catmull-Clark Subdivision Surfaces", ACM Trans. Graph. 33, 6, Article 190, Nov. 19, 2014, 9 pages.

Phogat, "Bone Handle Generation", U.S. Appl. No. 16/241,719, filed Jan. 7, 2018, 42 pages.

Phogat, "Digital Image Transformation Environment using Spline Handles", U.S. Appl. No. 15/936,299, filed Mar. 26, 2018, 42 pages.

Schaefer, "Image Deformation Using Moving Least Squares", SIGGRAPH, 25(3), Aug. 2006, 8 pages.

Schneider, "An Algorithm for Automatically Fitting Digitized Curves", Academic Press Professional, Inc., San Diego, CA, USA, 1990., pp. 612-626.

Shewchuk, "Triangle: Engineering a 2D Quality Mesh Generator and Delaunay Triangulator", Applied Computational Geometry: Towards Geometric Engineering, Lin M.C., Manocha D., (Eds.), val. 1148 of Lecture Notes in Computer Science. Springer-Verlag, May 1996, pp. 203-222. From the First ACM Workshop on Applied Computational Geometry., May 1996, 10 pages.

Visvalingam, "The Douglas-Peuker Algorithm for Line Simplification: Re-evaluation through Visualization", Sep. 1990, pp. 213-228.

Weng, "Sketching MLS Image Deformations on the GPU", Pacific Graphics 2008, vol. 27, Oct. 2008, 1789-1796.

"Pre-Interview First Office Action", U.S. Appl. No. 16/674,931, dated Feb. 20, 2020, 3 pages.

"Pre-Interview First Office Action", U.S. Appl. No. 16/241,719, dated Feb. 5, 2020, 39 pages.

Cohen-Steiner, "Conforming Delaunay Triangulation in 3D", Jun. 2004, pp. 217-233.

"Combined Search and Examination Report", GB Application No. 1816796.5, dated Apr. 17, 2019, 5 pages.

"Final Office Action", U.S. Appl. No. 15/852,924, dated Apr. 30, 2019, 17 pages.

"Notice of Allowance", U.S. Appl. No. 15/936,299, dated May 3, 2019, 9 pages.

Martins, "Bezier Curve Quick Tips: Two Methods for Smooth Curves", Posted Sep. 16, 2014; https://learn.scannerlicker.net/2014/09/16/bezier-curve-quick-tips-two-methods-for-smooth-curves/, Sep. 16, 2014, 11 pages.

"Pre-Interview First Office Action", U.S. Appl. No. 16/427,005, dated May 20, 2020, 23 pages.

"First Action Interview Office Action", U.S. Appl. No. 16/674,931, dated Apr. 10, 2020, 3 pages.

"First Action Interview Office Action", U.S. Appl. No. 16/241,719, dated Mar. 17, 2020, 4 pages.

Huynh, "Bijective Deformations in Rn via Integral Curve Coordinates", May 1, 2015, 11 pages.

Karni, "Spectral Compression of Mesh Geometry", Jul. 2000, 8 pages.

Meng, "Interactive Image Deformation Using Cage Coordinates on GPU", Jan. 2009, pp. 119-126.

Sorkine, "Laplacian Surface Editing", Jul. 2004, 10 pages.

"Notice of Allowance", U.S. Appl. No. 15/852,924, dated Aug. 2, 2019, 8 pages.

(56) References Cited

OTHER PUBLICATIONS

"Final Office Action", U.S. Appl. No. 16/674,931, dated Sep. 1, 2020, 13 pages.
"First Action Interview Office Action", U.S. Appl. No. 16/427,005, dated Jul. 13, 2020, 3 pages.
"Notice of Allowance", U.S. Appl. No. 16/241,719, dated Jun. 22, 2020, 11 pages.
"Notice of Allowance", U.S. Appl. No. 16/427,005, dated Jul. 31, 2020, 12 pages.
"Supplemental Notice of Allowability", U.S. Appl. No. 16/241,719, dated Jun. 26, 2020, 2 pages.
"Corrected Notice of Allowability", U.S. Appl. No. 16/241,719, dated Sep. 29, 2020, 2 pages.

* cited by examiner

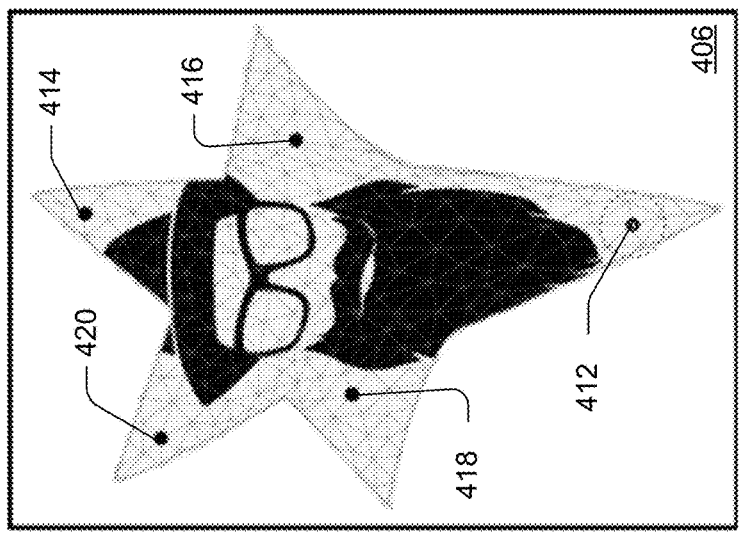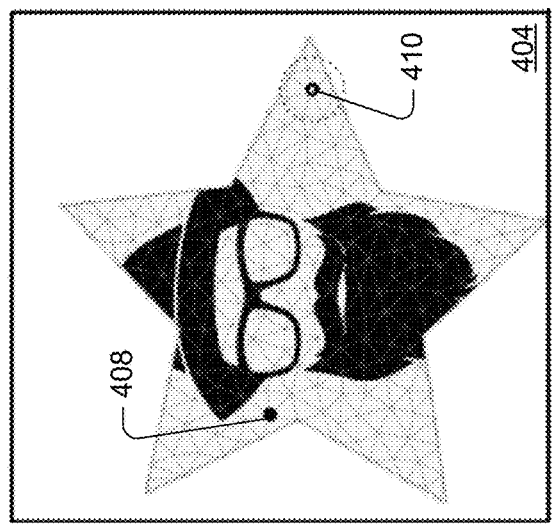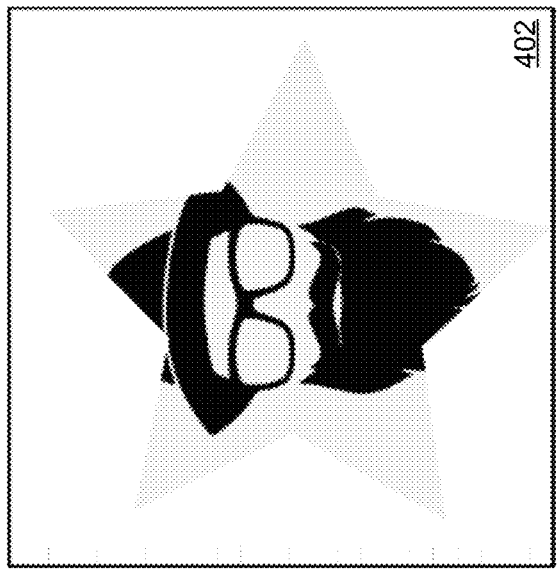
Fig. 4

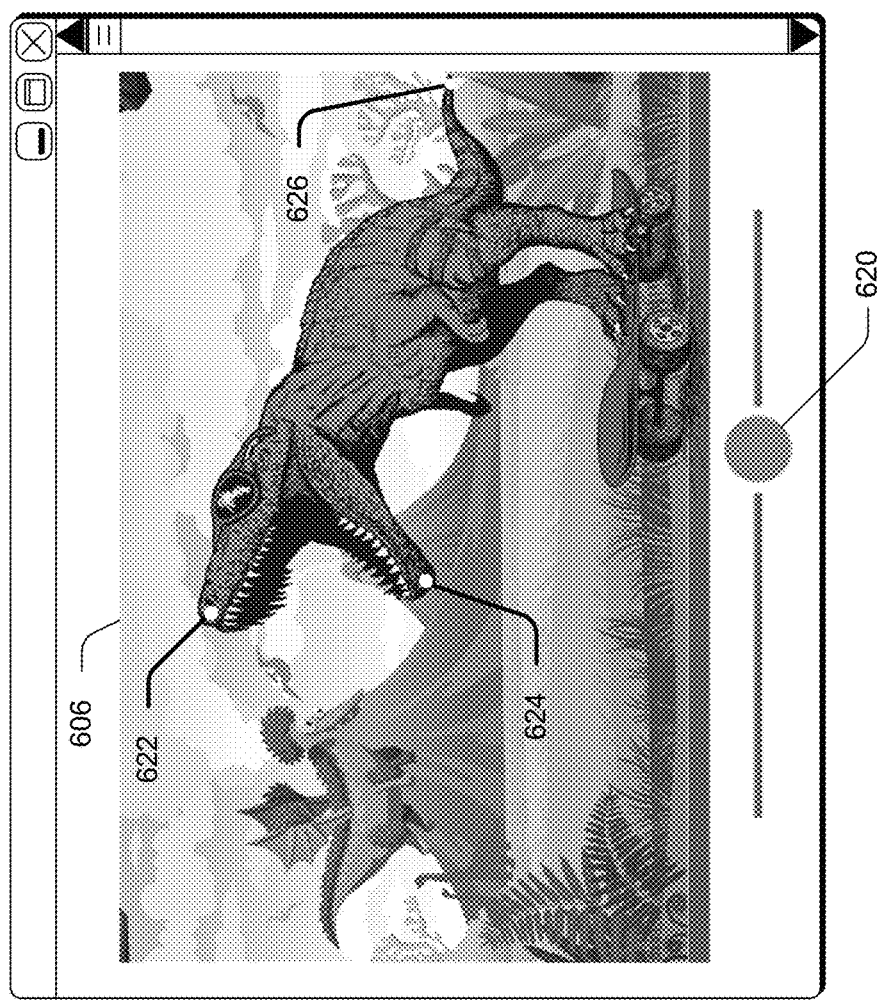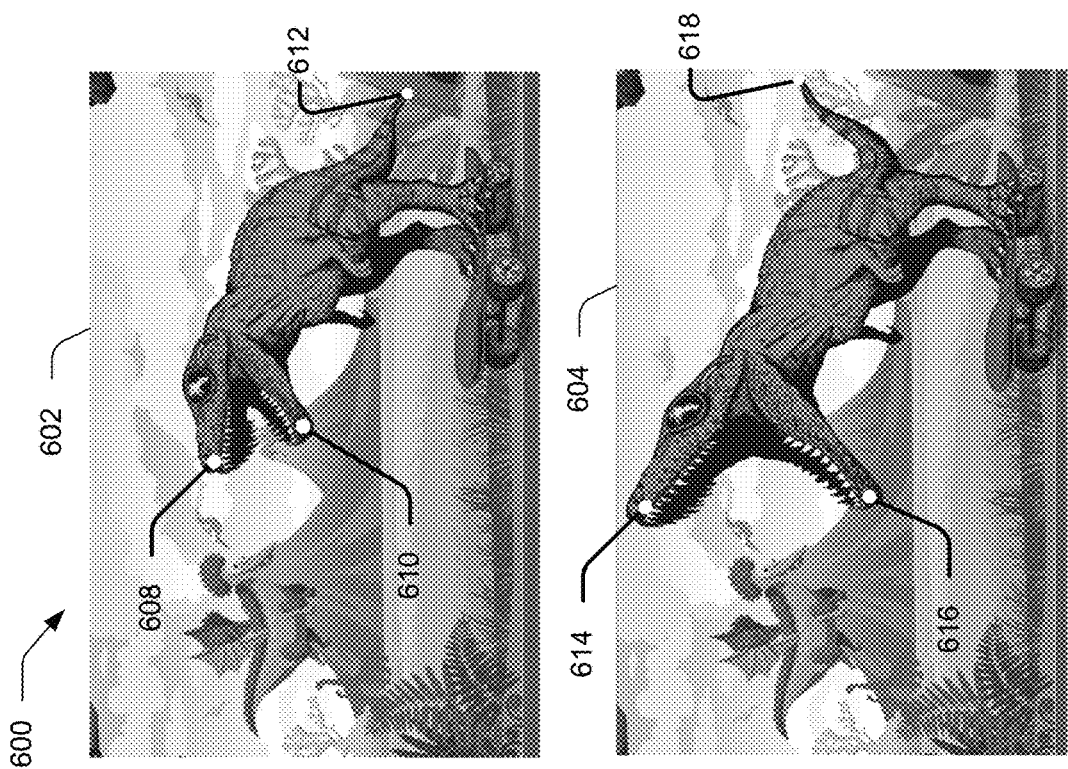
Fig. 6

900

902
Output a deformed triangular mesh generated by modifying a geometry of a base triangular mesh for a graphic object

904
Add a graphic manipulation handle to the deformed mesh and identify a triangle of the deformed triangular mesh that includes the graphic manipulation handle

906
Determine coordinates for the graphic manipulation handle relative to the triangle of the deformed triangular mesh

908
Determine a location for the graphic manipulation handle within a corresponding triangle of the base triangular mesh using the coordinates

910
Add the graphic manipulation handle to the base triangular mesh at the location and update the base triangular mesh by determining biharmonic weights for each vertex of the base triangular mesh after adding the graphic manipulation handle

*Fig. 9*

MULTI-STATE VECTOR GRAPHICS

BACKGROUND

With advances in computing technology, computing devices are an increasingly preferred mechanism for generating graphic animations, particularly for animations involving complex vector graphics. Conventional approaches for generating graphic animations, however, are often tedious and require large amounts of computational resources. For instance, in order to animate a graphic object, conventional approaches require creating an initial geometry, or "pose", for the graphic object, and subsequently creating new poses of the graphic object for various states of the animation, such as a new pose for each frame of the animation. Conventional approaches for creating new poses require creating a new pose of the graphic object from scratch, which does not guarantee consistency of the graphic object's properties among its various poses. Alternatively, some conventional approaches for generating a new pose of a graphic object enable duplication of the graphic object's initial pose and subsequent modification of the duplicate pose to achieve the new pose. The graphic object's initial pose and new poses are then stored together as an animation file.

Accordingly, techniques implemented by conventional graphic animation systems are faced with numerous challenges that involve the inefficient use of computational and network resources. One such challenge is the amount of inputs required to generate a new pose of a graphic object, either from scratch or by duplicating an initial pose and modifying a visual appearance of the duplicate. These multiple inputs are tedious and each waste computational resources consumed by a graphic animation creation system. Another such challenge is the amount of data storage required to maintain each graphic pose included in the animation, which wastes computational and network resources across a content delivery pipeline used to deliver the animation from a storage location to a viewing user's computing device. For example, in a scenario where a graphic animation is streamed from a server to a client computing device, playback of each frame in the graphic animation may cause the client computing device to transmit a request for a new pose of the animation and prompt the server to respond with the requested pose.

Problems faced by conventional systems are further compounded when dealing with animations that require interpolation between different poses of a graphic object. For example, an animation may include an initial pose of a graphic object that corresponds to a first frame of the animation and a second pose of the graphic object that corresponds to a fifth frame of the animation. In order to provide a visually smooth transition from the first frame to the fifth frame, interpolation between the initial pose and the second pose must be performed to determine how the graphic object should appear in the second, third, and fourth frames. Conventional techniques require a user to partition each of the initial and second poses into different components, correlate components of the different poses, and define handles in each of the partitioned poses to be interpolated. In addition to requiring further inputs that waste computational resources, conventional techniques for generating animations that involve graphic object interpolation are unable to deal with deformations in complex graphics, which results in interpolated graphic objects that bear little resemblance to the defined poses from which they were created.

Thus, conventional approaches for generating a graphic object animation are unable to handle complex graphics and waste computational and network resources by requiring both tedious inputs and storage of multiple graphic objects representing different poses in the animation.

SUMMARY

Generation of a multi-state symbol from an input graphic object is leveraged in a digital medium environment. To mitigate an amount of inputs required to generate different poses of a graphic object and reduce an amount of data storage required to maintain different poses used in animating the graphic object, a multi-state graphic symbol system is employed to generate an outline and a base mesh for a graphic object, which define an outer boundary of the graphic object and relationships between various regions of the graphic object (i.e., object topology), respectively. The multi-state graphic symbol system enables a user to place graphic manipulation handles relative to the base mesh and deform the base mesh by altering a state (e.g., position, rotational value, etc.) of at least one of the graphic manipulation handles. Vectors describing initial positions and final positions of the graphic manipulation handles are generated and stored with the outline and the base mesh, which collectively define a multi-state symbol for the input graphic object.

Additional poses of the graphic object can be generated by adding and modifying other graphic manipulation handles to either an original or a modified pose of the graphic object. To accommodate additional poses, the multi-state symbol's base mesh is updated upon each addition of a graphic manipulation handle, and each unique pose is stored as a vector in the multi-state symbol. Using these vectors, an additional pose of the graphic object can be generated by interpolating between different vectors of the multi-state symbol, and the interpolated pose can be stored for future use as a separate vector representation in the multi-state symbol. The multi-state graphic symbol system additionally enables for an interpolated pose to be generated based on user-defined paths between graphic manipulation handles of different poses, and maintains visual properties of even complex graphic objects without limiting the generation of new poses to linear interpolation. Thus, the techniques described herein enable generation of a multi-state symbol for a graphic object that accommodates for any number of different poses of the graphic object while reducing inefficiencies present in conventional digital content creation and delivery systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 4 illustrates the multi-state graphic symbol system of FIG. 1 generating a base mesh for a graphic object and a deformed mesh for the graphic object in accordance with one or more implementations.

FIG. 6 illustrates the multi-state graphic symbol system of FIG. 1 generating a new position for a graphic object by interpolating between a rest position and a final position of the graphic object in accordance with one or more implementations.

FIG. 9 is a flow diagram depicting a procedure in an example implementation for mapping a handle of a deformed mesh of a multi-state symbol to a base mesh of the multi-state symbol using the techniques described herein.

DETAILED DESCRIPTION

Overview

Figure 1:
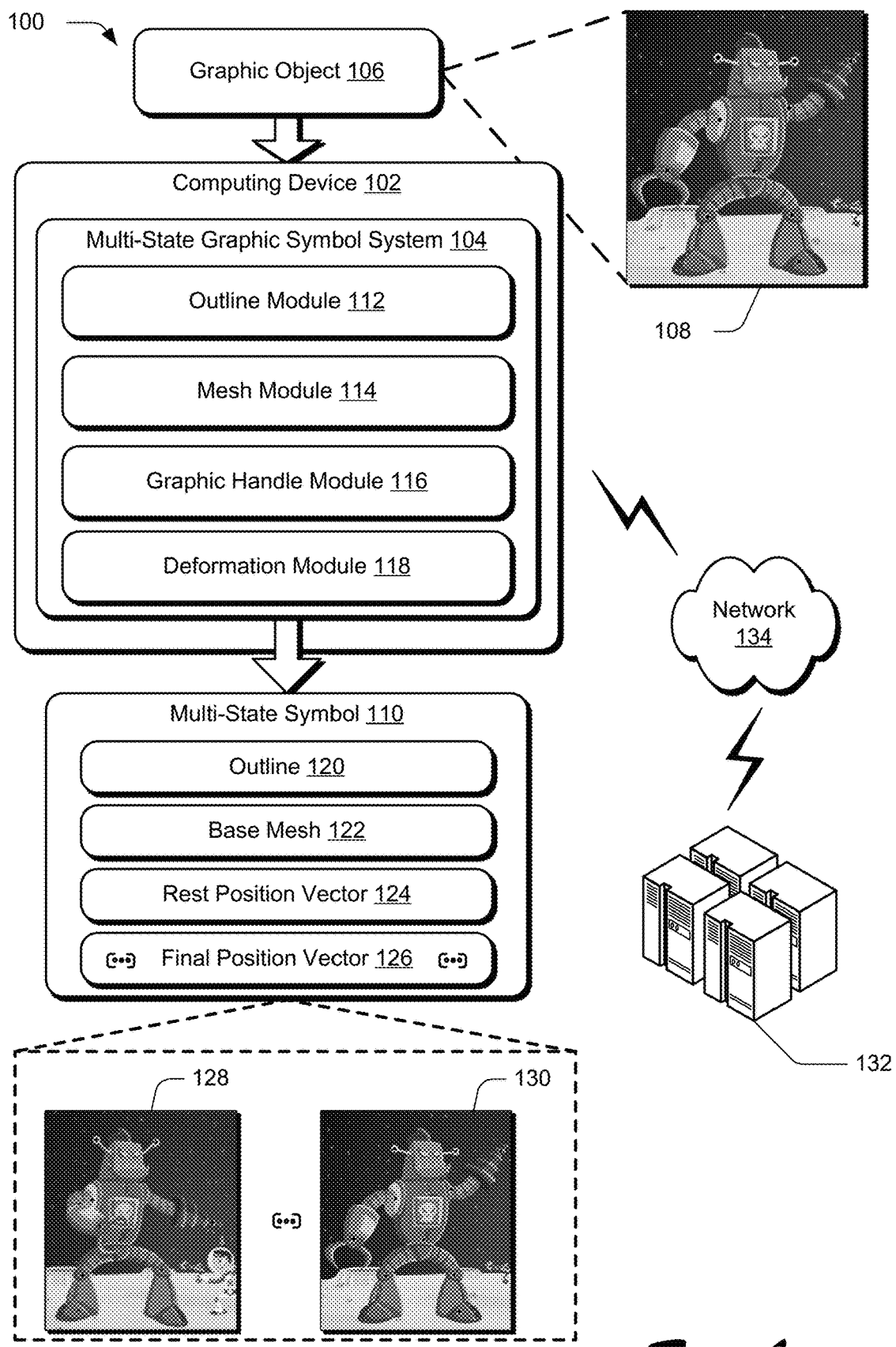
FIG. 1 is an illustration of an environment in an example implementation that is operable to employ the multi-state graphic generation and modification techniques described herein.

As a result of advances in computing technologies, computing systems are increasingly used as a platform for generating graphic animations, particularly for animations involving complex vector graphics. Conventional approaches for generating graphic animations, however, are often tedious and require large amounts of computational resources. For instance, in order to animate a graphic object, conventional approaches require creating an initial geometry, or "pose", for the graphic object, and subsequently creating new poses of the graphic object for various states of the animation, such as a new pose for each frame of the animation. In some instances, conventional approaches require creating a new pose of the graphic object from scratch, which is prone to creating inconsistencies in graphic object's properties among its various poses. Alternatively, some conventional approaches enable duplication of the graphic object's initial pose and then allow for subsequent modification of the duplicate pose to achieve the new pose. Regardless of how a new pose is created, conventional approaches store the graphic animation as a file that includes each separate pose stored separately within the file, along with information describing how to transition among the separate poses.

Accordingly, techniques implemented by conventional graphic animation systems are faced with numerous challenges that involve the inefficient use of computational and network resources. One such challenge is the amount of inputs required to generate a new pose of a graphic object, either from scratch or by duplicating an initial pose and modifying a visual appearance of the duplicate. These multiple inputs are tedious and each waste computational resources consumed by a graphic animation creation system. Another such challenge is the amount of data storage required to maintain each graphic pose included in the animation, which wastes computational and network resources across a content delivery pipeline used to deliver the animation from a storage location to a viewing user's computing device. For example, in a scenario where a graphic animation is streamed from a server to a client computing device, playback of each frame in the graphic animation may cause the client computing device to transmit a request for a new pose of the animation and prompt the server to respond with the requested pose.

Problems faced by conventional systems are further compounded when dealing with animations that require interpolation between different poses of a graphic object. For example, an animation may include an initial pose of a graphic object that corresponds to a first frame of the animation and a second pose of the graphic object that corresponds to a fifth frame of the animation. In order to provide a visually smooth transition from the first frame to the fifth frame, interpolation between the initial pose and the second pose must be performed to determine how the graphic object should appear in the second, third, and fourth frames. Conventional techniques require a user to partition each of the initial and second poses into different components, correlate components of the different poses, and define handles in each of the partitioned poses to be interpolated. In addition to requiring further inputs that waste computational resources, conventional techniques for generating animations that involve graphic object interpolation are unable to deal with deformations in complex graphics, which results in interpolated graphic objects that bear little resemblance to the defined poses from which they were created.

Accordingly, multi-state graphic symbol techniques and systems are described. In one example, a multi-state graphic symbol system receives a graphic object for which a multi-state symbol is to be generated. The multi-state graphic symbol system employs an outline module that is configured to rasterize the graphic object and generates an outline for the graphic object from the rasterization. The outline includes information describing a visual appearance of the graphic object, such as a number of raster elements (e.g., pixels) in the rasterized graphic object, metadata of the graphic object, an indicator of a rasterization method used to generated the rasterized graphic object, transparency parameters, and so forth. The multi-state graphic symbol system then employs a mesh module that is configured to generate a triangular base mesh for the outline of the graphic object. The base mesh is representative of a region of the graphic object enclosed by connected polylines, such as connected polylines specified in an edge list for the graphic object generated by the outline module. In some implementations, biharmonic weights are computed for each vertex of the base mesh, which are useable to define visual relationships between different portions of the graphic object, such that a deformation of the graphic object maintains visual fidelity to an original appearance of the graphic object.

After generating the base mesh for the graphic object, the multi-state graphic symbol system employs a graphic handle module to add at least one graphic manipulation handle to the base mesh. The graphic handle may be any type of graphic manipulation handle, such as a point, a bone handle, a point handle, a cage handle, a spline handle, combinations thereof, and so forth. Once graphic manipulation handles have been added to the base mesh, the graphic handle module generates a rest position vector for the base mesh, describing an initial state of each graphic manipulation handle, relative to the base mesh. The multi-state graphic symbol system then employs a deformation module that generates a deformed mesh for the graphic object in response to receiving input that modifies a state of one or more of the graphic manipulation handles, such as by altering a position of a handle, scaling a handle, rotating a handle, and so forth. For each handle modification, the deformation module determines new biharmonic weights for each vertex in the deformed mesh, and generates a final position vector that describes a state of each graphic manipulation handle as it exists in the deformed mesh. The outline, the base mesh, the rest position vector, and the final position vector are then output together as a multi-state symbol for the graphic object. Further deformations of the graphic object can be included as different poses for inclusion in the multi-state symbol by representing each different pose as a final position vector in the multi-state symbol. To render a particular pose of the multi-state symbol, the multi-state graphic symbol system identifies the corresponding final position vector and maps the outline and the base mesh to the identified final position vector. In this manner, different poses of the graphic object can be readily rendered and subsequently modified using a multi-state symbol, without storing separate copies of each different pose for the graphic object.

The multi-state graphic symbol system may additionally employ the deformation module to interpolate between different poses of a multi-state symbol, as represented by their respective final position vectors. For instance, the multi-state graphic symbol system may receive a selection of one or more graphic manipulation handles that are to be interpolated between different poses of the multi-state symbol along with an indication of an interpolation amount for transitioning the selected handle(s) between their different states. In some cases, the deformation module interpolates handles of different poses along user-defined interpolation paths, which enables for generating poses that do not linearly occur between different poses of a graphic object. In this manner, the multi-state graphic symbol system enables a user to easily animate a graphic object in a manner that accounts for any range of transitions between defined poses of the graphic object, without generating different frames of the animation from scratch or generating each pose of the animation and storing the different poses as duplicate instances of the graphic object.

Thus, the described techniques and systems provide advantages not enabled by conventional approaches through the provision of a multi-state graphic symbol system, which enables for generation of any number of different poses for a graphic object, and visually smooth transitions between the different poses, in an intuitive manner that minimizes an amount of input required to create and transition between the poses. Because the described techniques reduce an amount of input required to generate and transition among different poses of a graphic object, the techniques described herein improve efficiency in computational resource consumption by achieving different poses of graphic objects through fewer iterations of user input. For example, in contrast to conventional approaches for generating different poses of a graphic object from scratch, the techniques described herein enable generation of a different pose from a rest pose or a deformed pose in a manner that maintains visual fidelity to the rest pose without requiring the different pose to be created from scratch. Furthermore, because each different pose of a graphic object is represented as a vector included in the multi-state symbol that can be mapped to the outline and base mesh of the multi-state symbol, the described techniques and systems reduce computational resources required to store different poses of a graphic object, which conventional approaches otherwise require to be stored as separate visual representations.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 11.

The computing device 102 is illustrated as including a multi-state graphic symbol system 104. The multi-state graphic symbol system 104 represents functionality of the computing device 102 to receive a graphic object 106, such as the example graphic object 108, and create a multi-state symbol 110. The multi-state symbol 110 is a vector graphic representation of the graphic object 106. Using the techniques described herein, the multi-state symbol 110 can be deformed to generate different poses of the vector graphic representation in a manner that maintains fidelity to a visual appearance of the graphic object 106 by preserving relationships between various regions and components of the graphic object 106 during deformation. Additionally, the techniques described herein enable controlling a manner in which the multi-state symbol 110 visually transitions between different poses by specifying different interpolation paths for different points of the multi-state symbol 110 and causing each point to follow its interpolation path during the visual transition.

As described herein, the graphic object 106 is representative of an image, a portion of a video, text, a drawing, a document, a file, and so forth. In some implementations, the graphic object 106 is extracted from an asset that contains other types of media, such as a web page containing images and text. The graphic object 106 can be obtained by the computing device 102 in any suitable manner. For example, the graphic object 106 may be obtained from a different computing device, from file storage on computing device 102, and the like.

To generate the multi-state symbol 110, the multi-state graphic symbol system 104 employs an outline module 112, a mesh module 114, a graphic handle module 116, and a deformation module 118. The outline module 112, the mesh module 114, the graphic handle module 116, and the deformation module 118 are each implemented at least partially in hardware of the computing device 102 (e.g., through use of a processing system and computer-readable storage media), as described in further detail below with respect to FIG. 11.

The outline module 112 analyzes the graphic object 106 and identifies a geometry of the graphic object 106, as described in further detail below with respect to FIG. 2. After identifying the geometry of the graphic object 106, the outline module rasterizes the graphic object 106 and generates an outline from the rasterized graphic object. A rasterized graphic object generated by the outline module 112, along with any suitable information, such as a number of raster elements (e.g., pixels) in the rasterized graphic object, metadata of the graphic object, an indicator of a rasterization method used to generated the rasterized graphic object, transparency parameters and the like, is then used to generate the outline 120 for the multi-state symbol 110. The outline module 112 can generate the outline 120 in any suitable manner. In one implementation, the outline module 112 determines initial outlines from a grayscale rasterized graphic object, such as a rasterized graphic object corresponding to the entirety of the graphic object 106, a portion of the graphic object 106, or combinations thereof. The outline module 112 then provides the outline 120 to the mesh module 114.

Upon receiving the outline 120, the mesh module 114 generates a triangle mesh for the outline 120. For example, using information included in the edge list of the outline 120, mesh module 114 generates the base mesh 122 for the graphic object 106. The base mesh 122 is representative of a mesh for a region of the graphic object 106 enclosed by connected polylines, such as connected polylines specified in an edge list for the graphic object 106 generated by the outline module 112. Although described herein with respect to a triangle mesh (e.g., a mesh composed of triangle primitives), the mesh module 114 is configured to generate the base mesh 122 as any suitable type of mesh, as described in further detail below with respect to FIG. 2. The mesh module 114 is further configured to bind curves representing the graphic object 106 to the base mesh 122. After binding curves to the base mesh 122, the mesh module 114 provides the base mesh 122 to the graphic handle module 116.

Upon receiving the base mesh 122, the graphic handle module 116 is configured to receive input specifying at least one graphic manipulation handle to be added to the base mesh 122. A graphic manipulation handle added to the base mesh 122 by the graphic handle module 116 may be any suitable type of graphic manipulation handle, such as a point, a bone handle, a point handle, a cage handle, a spline handle, combinations thereof, and so forth. For each graphic manipulation handle generated by the graphic handle module 116, the base mesh 122 is updated such that the base mesh 122 includes information describing barycentric coordinates of each graphic manipulation handle. The graphic handle module 116 stores information describing graphic manipulation handles added to the base mesh 122 as rest position vector 124. Functionality of the graphic handle module 116 is described in further detail below with respect to FIG. 2. After adding handles to the base mesh 122 and generating the rest position vector 124, the graphic handle module 116 communicates the base mesh 122 and the rest position vector 124 to the deformation module 118.

Deformation Module 118 is configured to deform base mesh 122 using any suitable transformation or workflow that operates on a mesh (e.g., a triangle mesh). In an example implementation, deformation module 118 assigns weights to vertices of base mesh 122, such as according to how base mesh 122 is distributed over an area or shape. When the base mesh 122 is deformed, such as by dragging a handle added via graphic handle module 116, deformation module 118 determines new weights for vertices on the mesh based on linear combinations of the weights, and determine new positions of vertices in a deformed mesh. In this manner, the deformation module is configured to generate a deformed mesh based on input that adjusts a position or property of a graphic manipulation handle added to the base mesh 122 by the graphic handle module 116.

The new positions of the graphic manipulation handles can be used to define a new pose of the graphic object 106 and stored for inclusion in the multi-state symbol 110 as final position vector 126. In this manner, the multi-state graphic symbol system 104 generates the multi-state symbol 110 with information describing at least a rest position, such as pose 128, and a final position, such as pose 130, of the graphic object 106, without requiring storage of multiple copies or instances of the graphic object 106, thereby reducing an amount of data storage and computational resources required to maintain the multi-state symbol 110. Thus, the final position vector 126 is representative of information necessary to describe a final position of the graphic object 106 after the base mesh 122 is deformed by the deformation module 118. As described in further detail below with respect to FIG. 2, the multi-state graphic symbol system 104 is configured to generate a multi-state symbol 110 that includes any number of final position vectors 126, each representative of a different pose for the graphic object 106.

The multi-state symbol 110 may be stored in storage of the computing device 102 for subsequent use, as described in further detail below with respect to FIG. 11. Alternatively or additionally, the multi-state graphic symbol system 104 is configured to provide the multi-state symbol 110 to a service provider for subsequent retrieval and/or access by the computing device 102 or different computing devices. For instance, the multi-state graphic symbol system 104 may communicate the multi-state symbol 110 to service provider 132, or directly to a different computing device, via network 134.

Having considered an example digital medium environment, consider now a discussion of an example system usable to generate a multi-state symbol for a graphic object in accordance with one or more aspects of the disclosure.

Figure 2:
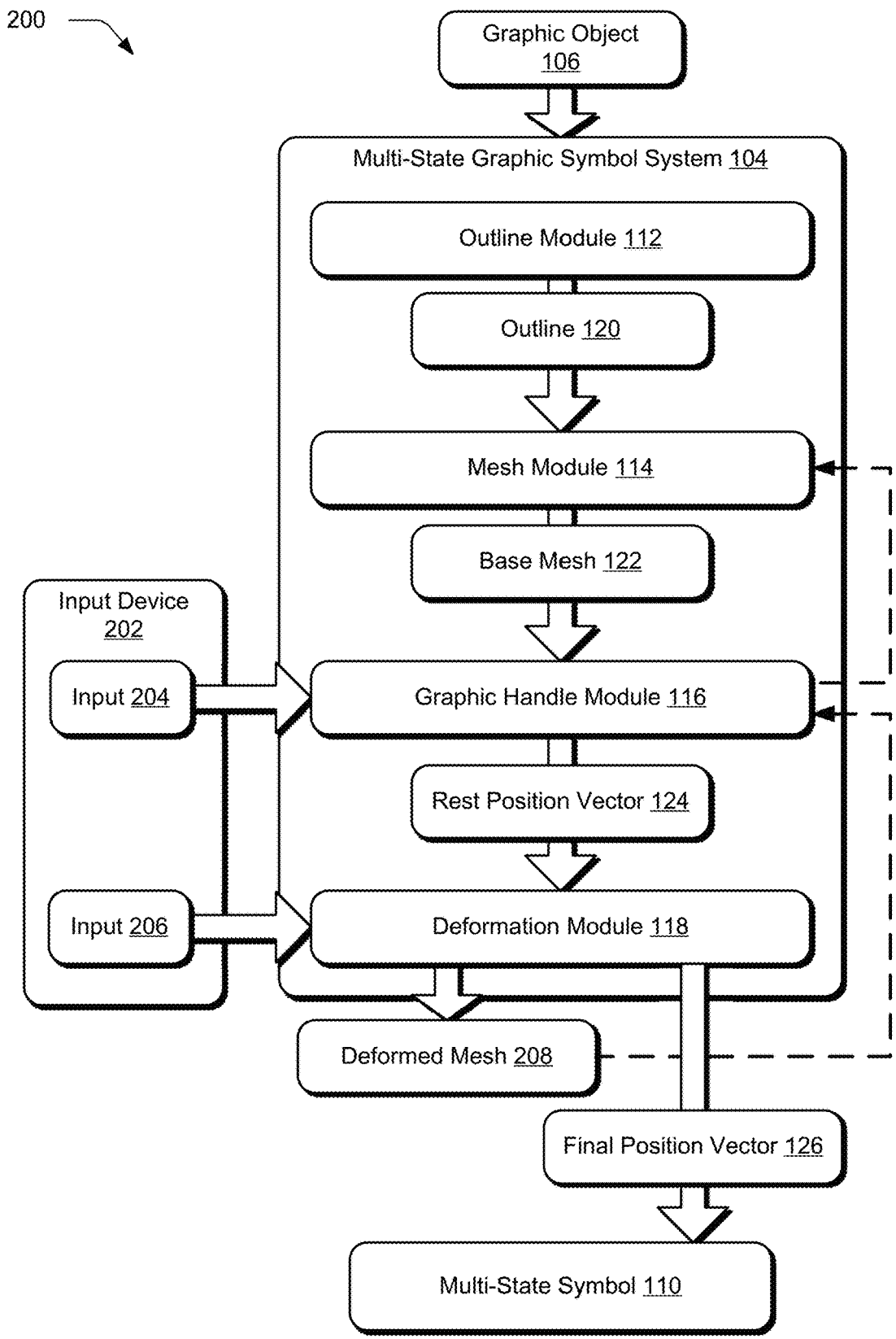
FIG. 2 illustrates an example implementation in which a multi-state graphic symbol system of FIG. 1 generates a multi-state symbol using techniques described herein.

FIG. 2 illustrates an example system 200 useable to generate a multi-state symbol 110 of a graphic object 106 in accordance with the techniques described herein. In the illustrated example, system 200 includes the modules of the multi-state graphic symbol system 104 as described with respect to FIG. 1, e.g., outline module 112, mesh module 114, graphic handle module 116, and deformation module 118. System 200 may be implemented on any suitable device or combination of devices. In one example, system 200 is implemented on one computing device (e.g., computing device 102 of FIG. 1). In another example, system 200 is implemented on more than one computing device.

Upon receiving a graphic object 106 from which a multi-state symbol is to be generated, the outline module 112 analyzes the graphic object 106 and identifies a geometry of the graphic object 106. In one example, the graphic object 106 is represented by curves, such as n-th order polynomial splines, (e.g., n=1, 2, 3, or 4), Bezier segments, combinations thereof, and the like. In some implementations, the outline module 112 identifies a geometry of the graphic object 106 from metadata of the graphic object 106. Alternatively or additionally, the outline module 112 identifies the geometry of the graphic object 106 using an automatic image-recognition technique, such as a vector detection algorithm.

After identifying the geometry of the graphic object 106, the outline module rasterizes the graphic object 106 and generates an outline from the rasterized graphic object. A rasterized graphic object generated by the outline module 112 can be any suitable type of rasterized graphic object, such as a bit map, pixel values, dot matrix data structure, combinations thereof, and so forth. In one implementation, a rasterized graphic object includes a grayscale image with a transparency parameter (e.g., alpha channel) to represent transparency of pixels in the image with a percentage of the transparency parameter.

Using the techniques described herein, a rasterized graphic object generated by the outline module 112 may include any suitable number of raster elements (e.g., pixels) whose values are represented by any suitable type of data, such as a number of bits, values in a coordinate system (e.g., a color coordinate system), combinations thereof, and the like. The outline module 112 can rasterize the graphic object 106 in any suitable manner, such as based on user-specified parameters (e.g., a user-designated resolution in terms of numbers of pixels), based on analyzing a graphic object (e.g., for spectral content) and determining a resolution based on results of the analyzing (e.g., using a higher number of pixels for graphic objects with higher spectral content than graphic objects with lower spectral content), according to a default resolution, and the like.

A rasterized graphic object generated by the outline module 112, along with any suitable information, such as a number of raster elements (e.g., pixels) in the rasterized graphic object, metadata of the graphic object, an indicator of a rasterization method used to generated the rasterized graphic object, transparency parameters and the like, is then used to generate the outline 120 for the multi-state symbol 110. The outline 120 is representative of one or more outlines of one or more respective portions of a rasterized graphic object generated from graphic object 106. One or more portions of a rasterized graphic object may be determined by a user, such as via selection in a user interface provided by a display of a computing device implementing the multi-state graphic symbol system 104. In some implementations, one or more portions of a rasterized graphic object are determined automatically and without user intervention by the outline module 112 by analyzing content of the rasterized graphic object, such as by implementing a neural network trained to distinguish among characteristics or properties of a graphic object.

The outline 120 includes at least one chain of pixels denoting a boundary of the graphic object 106 or a portion of the graphic object 106. As such, pixel interior to the outline represent the graphic object 106, while pixels exterior to the outline 120 do not constitute the graphic object 106. The outline module 112 can generate the outline 120 in any suitable manner. In one implementation, the outline module 112 determines initial outlines from a grayscale rasterized graphic object, such as a rasterized graphic object corresponding to the entirety of the graphic object 106, a portion of the graphic object 106, or combinations thereof. The outline module 112 then inflates the initial outlines by merging outlines within a proximity that satisfies a threshold inflation amount. Satisfaction of the threshold inflation amount may be defined in any suitable manner. For instance, outlines within a threshold amount of pixels (e.g., 3 pixels) of one another are merged into one outline. The inflation threshold (e.g., 3 pixels) can be user-selectable or automatically determined (e.g., without user intervention) by the outline module 112. Additionally or alternatively, the outline module 112 may detect that two or more disjoint outlines have been generated for a graphic object of an image that includes multiple graphic objects, and inflate the disjoint outlines into a single outline for the graphic object.

In some implementations, outlines generated by the outline module 112 are exposed in a user interface by a display of a computing device implementing the multi-state graphic symbol system 104, such as computing device 102 of FIG. 1, for editing by a user. For instance, the outline 120 may be exposed in a user interface for correction or refinement of the outline 120. In some implementations, a user may select the outline 120 and drag one or more portions to change its shape, position, or combinations thereof, so that the outline 120 better corresponds to the graphic object 106.

After a chain of pixels denoting the boundary of the graphic object 106 is determined, the outline module 112 is configured to determine an edge list for the graphic object 106. An edge list for the graphic object 106 includes a plurality of polylines generated by the outline module 112 and may be configured as any suitable format and style of edge list. For instance, an edge list for the graphic object 106 may include vertices of the polylines (e.g., start and stop points of each polyline) and indications of how the polylines are connected. In an example implementation where the outline 120 of the graphic object 106 is a square, an edge list for the square may include our vertices (e.g., the corners of the square) and instructions to connect the four corners of the square with four polylines that do not include a diagonal polyline. Thus, an edge list for the outline 120 describes how the polylines of the outline 120 are connected to one another so that the resulting shape of the connected polylines corresponds to a visual outline of the graphic object 106. In this manner, rather than defining the outline 120 by a chain of pixels, which can require a significant amount of memory and computational resources, representing the outline 120 as a set of connected polylines described by an edge list requires significantly less memory and fewer computational resources.

In some implementations, the outline module 112 determines an edge list for the outline 120 using a Ramer-Douglas-Peucker (RDP) algorithm to reduce the outline 120 to a connected set of polylines and represents the polylines in an edge list. An RDP algorithm is an algorithm for reducing the number of points in a curve that is approximated by a series of points. For instance, an RDP algorithm can be implemented as an iterative end-point fit algorithm that takes a curve composed of line segments and finds a similar curve with fewer points.

In some implementations, the outline module 112 is configured to automatically, without user intervention, detect a singularity condition of polylines represented in an edge list, such as a condition that would hinder mesh generation or cause mesh generation to fail. One example of a singularity condition is self-overlapping polylines, e.g., collinear polylines that overlap along a line. In response to detecting a singularity condition, the outline module 112 is configured to automatically (i.e., without user intervention) inflate one or more polylines to correct the singularity condition such as causing self-overlapping polylines to no longer overlap along a line. Additionally or alternatively, outline module 112 may provide a correction mechanism for a user of a computing device implementing the multi-state graphic symbol system 104 to manually modify one or more polylines of the outline 120. For instance, a correction mechanism provided by the outline module 112 may enable a user to move an endpoint of one or more polylines of the outline 120, and consequently modify a shape and position of the boundary represented by the connected polylines. In response to such a modification, the outline module 112 revises an edge list created for the outline 120 and stores the edge list in metadata of the outline 120. The outline module 112 then provides the outline 120 to the mesh module 114.

Upon receiving the outline 120, the mesh module 114 generates a triangle mesh for the outline 120. For example, using information included in the edge list of the outline 120, mesh module 114 generates the base mesh 122 for the graphic object 106. The base mesh 122 is representative of a mesh for a region of the graphic object 106 enclosed by connected polylines, such as connected polylines specified in an edge list for the graphic object 106 generated by the outline module 112. Although described herein with respect to a triangle mesh (e.g., a mesh composed of triangle primitives), the mesh module 114 is configured to generate the base mesh 122 as any suitable type of mesh.

The mesh module 114 is configured to generate the base mesh 122 in a variety of manners. In one implementation, the mesh module 114 generates the base mesh 122 using a Delaunay triangulation technique, such as that described in Triangle: Engineering A 2D Quality Mesh Generator and Delaunay Triangulator by Shewchuk, J. R. (1996), Applied Computational Geometry Towards Geometric Engineering, Lecture Notes in Computer Science, vol. 1148, pp. 203-222, Springer, Berlin, Heidelberg, the disclosure of which is incorporated herein by reference in its entirety.

Mesh module 114 is configured to generate the base mesh 122 under any number of constraints, such as constraints requiring triangles of the base mesh 122 to have at least a minimum angle (e.g., 20 degrees), constraints requiring triangles of the base mesh 122 to include no more than a maximum number of pixels of a rasterized image (e.g., no more than 256 pixels), constraints requiring triangles of the mesh to include at least a minimum number of pixels of a rasterized image (e.g., at least 32 pixels), combinations thereof, and so forth.

The mesh module 114 is configured to represent the base mesh 122 in any suitable manner. For instance, in one implementation the base mesh 122 is represented using triplets of vertices (e.g., coordinates of vertices), where each triplet represents a triangle in the mesh. Additionally or alternatively, a list of vertices of the base mesh 122 and their locations (e.g., coordinates) can be generated by the mesh module 114, and each triangle in the base mesh can be represented by a triplet of indices of vertices (e.g., numbers on the list of vertices). In this implementation, coordinates of the vertices can be determined from the list of vertices for the base mesh 122. In some implementations, the base mesh 122 of the graphic object 106 can be linked to, or merged with, a base mesh of a different graphic object. As an example, a mesh of a horse may be joined with a mesh of a carriage being towed by the horse so that a single mesh can be deformed to modify both the horse and carriage.

Because the base mesh 122 is generated based on polylines described in an edge list representing the outline 120 of the graphic object 106, rather than curves representing graphics (e.g., vector graphics) of the image, the density of the mesh (e.g., number of triangles in the mesh) generated by the mesh module 114 is independent from the density of the curves representing the image (e.g., the number of curves representing the image). Consequently, the base mesh 122 is uniformly generated and smooth in nature (e.g., triangles can be roughly a same size, and the number of triangles is not so large as to require prohibitively large computations or storage).

The mesh module 114 is further configured to bind curves representing the graphic object 106 to the base mesh 122. In some implementations, binding curves representing the graphic object 106 is performed by sampling the curves and binding the samples of the curves to the base mesh 122. The mesh module 114 is configured to determine samples of the curves in any suitable manner. For instance, the mesh module 114 may generate samples of curves representing the graphic object 106 adaptively based on a length of the curve or a length of a segment of a curve (e.g., a length of a polynomial in a spline). In some implementations, a number of samples per curve, or per segment, can be determined from a length of the curve (e.g., a longer curve may be sampled with more samples and different sample spacing than a shorter curve). The mesh module 114 is configured to bind curves to the base mesh 122 in a variety of manners.

In one example implementation, the mesh module 114 binds a plurality of curves to the base mesh by representing samples of the plurality of curves with coordinates of the samples and correlating the coordinates to a respective triangle in the base mesh 122. Continuing this example implementation, the mesh module 114 may determine a mesh index for the base mesh (e.g., an indication of a specific mesh when the graphic object 106 includes multiple meshes) and a respective triangle in the mesh which contains the sample (e.g., an indicator of where the sample lies with respect to a particular triangle in the mesh). Given this determination, the mesh module 114 determines coordinates of the sample with respect to the particular triangle in the base mesh 122.

Coordinates for a curve sample with respect to a particular triangle of a triangular base mesh 122 may be configured as any suitable type of coordinates that are useable to determine a position of the sample from a position of the triangle. For instance, the mesh module may determine barycentric coordinates for a curve sample with respect to a particular triangle in a mesh. Barycentric coordinates are a set of numbers that are useable to uniquely describe a location of a point in a triangle, with respect to the vertices of the triangle. For example, consider a triangle T that is defined by its three vertices $r_1$, $r_2$, and $r_3$. A point, r, located inside the triangle can be written as a unique linear, convex combination of the three vertices $r_1$, $r_2$, and $r_3$. Accordingly, there exists a unique set of three non-negative numbers $\lambda_1$, $\lambda_2$, and $\lambda_3$ which sum to unity (e.g., $\lambda_1+\lambda_2+\lambda_3=1$), such that:

$$r=\lambda_1 \cdot r_1+\lambda_2 \cdot r_2+\lambda_3 \cdot r_3.$$

The set of numbers $\lambda_1$, $\lambda_2$, and $\lambda_3$ are the barycentric coordinates of the point r with respect to the triangle defined by the vertices $r_1$, $r_2$, and $r_3$. As such, any point within a triangle, including a point positioned on a line connecting two vertices of the triangle, can be represented by barycentric coordinates of the point with respect to the triangle. When expressed in terms of Cartesian coordinates, e.g., $r=(x,y)$, the barycentric coordinates of the point r are expressed as linear, convex combinations of the components of the vertices of the triangle, where:

$$x=\lambda_1 \cdot x_1+\lambda_2 \cdot x_2+\lambda_3 \cdot x_3;$$

$$y=\lambda_1 \cdot y_1+\lambda_2 \cdot y_2+\lambda_3 \cdot y_3; \text{ and}$$

$$r_i=(x_i,y_i), i=1,2,3.$$

In some implementations, the mesh module 114 uses a bounding volume hierarchy to speed the process of binding a sample to a respective triangle in the base mesh 122. To do so, the mesh module 114 determines rectangles as bounding volumes for triangles in the base mesh 122, and the rectangles of the bounding volume hierarchy structure are searched to determine an appropriate triangle in the mesh. As described herein, searching a rectangle may include the mesh module 114 separating the rectangle into quadrants, determining if a sample is in a respective quadrant, and determining a respective triangle associated with the respective quadrant. By using a bounding volume hierarchy to determine if a sample is first in a respective quadrant of a rectangle and then associating a triangle with the respective quadrant, instead of directly searching triangles to determine a respective triangle for binding a sample, the mesh module 114 is configured to efficiently bind samples of curves to triangles in a triangle mesh in real time (e.g., without perceptible delay to a user).

The mesh module 114 is configured to represent samples of curves in the graphic object 106 and the binding of the samples to the base mesh 122 in any suitable manner. In one example, the mesh module 114 represents the samples as tuples including an index of a respective triangle mesh (e.g., when the graphic object 106 includes multiple meshes for multiple outlines generated by the outline module 112 and the index denotes an appropriate one of the meshes), an index of a respective triangle in the respective triangle mesh to which the sample is bound, and coordinates (e.g., barycentric coordinates) of the sample with respect to the respective triangle to which the sample is bound. In one example, tuple representations of samples include all three barycentric coordinates (e.g., $\lambda_1$, $\lambda_2$, and $\lambda_3$) for a respective sample. Additionally or alternatively, a tuple representation of a sample can include only two of three barycentric coordinates (e.g., any two of $\lambda_1$, $\lambda_2$, and $\lambda_3$) for the sample, and the third coordinate can be computed for the sample from the constraint that the barycentric coordinates sum to unity. The mesh module 114 then provides the base mesh 122 to the graphic handle module 116.

Upon receiving the base mesh 122, the graphic handle module 116 is configured to receive input specifying at least one graphic manipulation handle to be added to the base mesh 122. Input specifying graphic manipulation handles to be added to the base mesh 122 is represented by input 204, which may be received from an input device 202 of a computing device implementing the multi-state graphic symbol system 104, such as computing device 102 of FIG. 1. The input device 202 may be configured in any suitable manner, and is representative of an input device of the computing device 102, as described in further detail below with respect to FIG. 11.

Upon receiving input 204, the graphic handle module 116 is configured to add at least one graphic manipulation handle (e.g., control points) to respective triangles of the base mesh 122. In some implementations, a graphic manipulation handle added to the base mesh 122 by the graphic handle module 116 may be a point, which is operable to prevent deformation of the base mesh 122. As an example, a point may remain at a fixed position and the base mesh 122 can be deformed by rotating the base mesh 122 about the position, rather than moving the point from the position when the base mesh 122 is deformed. Alternatively or additionally, a graphic manipulation handle may be a bone handle, a point handle, a cage handle, or a spline handle, which may be manipulated by user input, such as user input 206 received by the deformation module 118, described in further detail below, to generate a deformed mesh 208 from the base mesh 122.

When configured as a spline handle, a graphic manipulation handle generated by the graphic handle module 116 may be defined using a curve, such as a Bézier curve. For instance, a series of points may be input via input 204 to define a curve in a segment. In this way, the segment may be drawn to follow the curve of a portion of the graphic object 106. For instance, in an implementation where the base mesh 122 is generated from the robot graphic object illustrated at 108 in FIG. 1, a curve may be drawn to define an arm of the robot. In another instance, a user may draw a freeform line via input 204 to define a segment as following a different portion of the robot graphic object illustrated at 108 in FIG. 1. A curve is then fit to this segment by the computing device implementing the multi-state graphic symbol system 104, which may be performed using a cubic Bézier curve or other curve. Regardless of how input, the curve is used by the graphic handle module 116 to generate a spline handle.

For each graphic manipulation handle generated by the graphic handle module 116, the base mesh 122 is updated such that the base mesh 122 includes information describing barycentric coordinates of each graphic manipulation handle. This updating of the base mesh 122 is performed by the mesh module 114, and is illustrated by the dashed arrow of the graphic handle module 116 communicating information describing handles added via input 204 to the mesh module 114. The graphic handle module 116 stores information describing graphic manipulation handles added to the base mesh 122 as rest position vector 124. After adding handles to the base mesh 122 and generating the rest position vector 124, the graphic handle module 116 communicates the base mesh 122 and the rest position vector 124 to the deformation module 118.

Deformation Module 118 is configured to deform base mesh 122 to produce deformed mesh 208 using any suitable transformation or workflow that operates on a mesh (e.g., a triangle mesh). In one example, a skinning transformation is applied to a mesh by deformation module 118 to produce a deformed mesh. A skinning transformation is described in Fast Automatic Skinning Transformations by Alec Jacobson et al., ACM Transactions on Graphics, Volume 31, Issue 4, Article 77, July 2012, the disclosure of which is incorporated herein by reference in its entirety.

Additionally or alternatively, a workflow using diffusion curves can be applied to a mesh by deformation module 118 to produce a deformed mesh. A workflow using diffusion curves is described in A Vectorial Solver For Free-Form Vector Gradients by S. Boyé et al., ACM Transactions on Graphics, Volume 31, Issue 6, Article 173, November 2012, the disclosure of which is incorporated herein by reference in its entirety.

Additionally or alternatively, a workflow using vector fields can be applied to a mesh by deformation module 118 to produce a deformed mesh. A workflow using vector fields is described in Vector Field Processing On Triangle Meshes by F. do Goes et al., Proceedings SIGGRAPH, Article 17, Kobe, Japan, Nov. 2-6, 2015, ACM, New York, N.Y., the disclosure of which is incorporated herein by reference in its entirety.

In an example implementation, deformation module 118 assigns weights to vertices of a mesh, such as according to how a mesh is distributed over an area or shape. When a mesh is deformed, such as by dragging a handle, deformation module 118 determines new weights for vertices on the mesh based on linear combinations of the weights, and determine new positions of vertices in the deformed mesh, such as deformed mesh 208, based on the new weights.

Additionally or alternatively, the deformed mesh 208 is generated by deformation module 118 consistent with constraints applied to the base mesh 122 by the graphic handle module 116. For instance, deformation module 118 can constrain triangles of the deformed mesh 208 to have at least a minimum angle, to include no more than a maximum number of pixels of a rasterized graphic object, to include at least a minimum number of pixels of a rasterized graphic object, combinations thereof, and so forth.

The deformed mesh 208 may be represented in any suitable manner. In one implementation, deformation module represents deformed mesh 208 using triples of coordinates of vertices, each triplet representing a triangle in the deformed mesh. Additionally or alternatively, a list of vertices of the deformed mesh 208 and their locations (e.g., coordinates) can be generated by deformation module 118, and each triangle in the deformed mesh can be represented by a triplet of indices of vertices (e.g., numbers on the list of vertices). Deformation module 118 is additionally configured to generate deformed mesh 208 with the information necessary to reconstruct curves of the graphic object 106 in a manner that maintains fidelity to a visual appearance of the graphic object 106 prior to deformation, such as deformation resulting from input 206. For instance, once the base mesh 122 is deformed, vertices of triangles may change positions in the deformed mesh 208, relative to the base mesh 122 prior to deformation.

Because the barycentric coordinates of a sample bind the sample to a triangle in the mesh, using the barycentric coordinates and the new positions of the vertices of a respective triangle in the deformed mesh 208, new positions of the samples in the deformed mesh 208 can be determined. Given this information, the multi-state graphic symbol system 104 can generate reconstructed curves from the new positions of the samples to generate the multi-state symbol 110. Generating reconstructed curves can include determining basis points of curves (e.g., Bezier splines, Bezier segments, polynomials, and the like) from the new positions of the samples. For instance, curve fitting, such as by minimizing a mean squared error, can be performed to get new basis points of Bezier segments based on the new positions of the samples.

The new positions of the samples can be used to define a new position of the graphic object 106 and defined using the final position vector 126 for inclusion in the multi-state symbol 110. In this manner, the multi-state graphic symbol system 104 generates the multi-state symbol 110 with information describing at least a rest position and a final position of the graphic object 106, without requiring storage of multiple copies or instances of the graphic object 106, thereby reducing an amount of data storage and computational resources required to maintain the multi-state symbol 110. Thus, the final position vector 126 is representative of information necessary to describe a final position of the graphic object 106, such as such as curve fitting data, sample locations, graphic manipulation handle points, and so forth.

In some implementations, the deformed mesh 208 may be generated from input 206 to a spline graphic manipulation handle added to the base mesh 122. As described herein, a spline graphic manipulation handle may be configured to support user interaction along both endpoints of the spline handle, as well as at any internal point along the segment of the spline handle between the endpoints. A user, for instance, may interact with a user interface to "grab" any point of the spline handle along the segment via input 206. The deformation module 118 then uses changes to the spline handle to control transformations made to underlying artwork under that segment. In this way, the spline handle acts in an intuitive manner as a controlling structure for transforming the artwork based on changes that are directly made to the segment of the spline handle. This may be used to support a variety of transformations, including translation, rotation, and scaling of the graphic object 106.

The deformation module 118, for instance, may detect movement of an internal point along the segment of the spline handle as a result of input 206. In response to such input 206, the deformation module 118 refits the segment of the spline automatically and without user intervention in real time as the internal point is moved. To do so in one example, the deformation module 118 uses an initial and final (e.g., current) position of the internal point to adjust a tangent handle used to define a direction of a curve of the segment. This is used by the deformation module 118 to regenerate the segment of the curve for inclusion in the deformed mesh 208.

Each deformation to the base mesh 122 is combined by the deformation module 118 with a weight that is handle-specific. In one example, the weight of a handle's endpoint may be set to "1" and decrease to zero as a gradient (e.g., linearly) that follows the segment (e.g., edge in the base mesh 122), which connects it to the next graphic manipulation handle, and is set as "0" elsewhere in the base mesh 122. These handle-specific weights are combined and used to control an amount of the transformation or deformation that is to be applied to respective components of the graphic object 106, as specified by vertices in the triangular base mesh 122. As descried herein, a spline handle generated by graphic handle module 116 may also support relative scaling of components of an input geometry of the graphic object 106 (e.g., an arm, a leg, a claw, an antenna, etc. of the robot graphic object 108 illustrated in FIG. 1). An internal point of the spline handle, for instance, may be moved via input 206 from any point along the length of the spline handle, thereby causing a change in a midpoint of the spline handle. This causes the deformation module 118 to change a relative scale to underlying components of the graphic object 106 in proportion to a length of the segment of the spline handle in relation to an amount the internal point is moved by input 206.

In this manner, the deformed mesh 208 may be generated from the base mesh 122 by translation, rotation, and/or scaling of the base mesh 122 via input 206. For a given handle, a transformation matrix may be formed as a 3×3 square matrix, an example of which follows:

$$T_1 = \begin{bmatrix} a_{11} & a_{12} & a_{13} \\ a_{21} & a_{22} & a_{23} \\ a_{31} & a_{32} & a_{33} \end{bmatrix}$$

In the above matrix, the values of $a_{13}$ and $a_{23}$ define translation in x and y directions, the values $a_{11}$, $a_{12}$, $a_{21}$, and $a_{22}$ represent scale and rotation along x and y axes, respectively, and the values $a_{31}$, $a_{32}$, and $a_{33}$ are added for homogeneity. Scale, rotation, and translation are concatenated in the order to generate the deformed mesh 208. "T" is initialized as an identity matric for each control point as follows:

$$T_1 = \begin{bmatrix} 1 & 0 & 0 \\ 0 & 1 & 0 \\ 0 & 0 & 1 \end{bmatrix}$$

In some implementations, a rotation component may be removed by the deformation module 118 that may exist due to an initial position of tangents of a tangent handle added to base mesh 122. This may be performed such that the deformed mesh is correctly generated to avoid non-uniform scaling that may result in skewing of the graphic object 106's visual appearance if it is rotated. The rotation component in the transformation matrix above may be represented as follows:

$a_{11} = \cos \Theta$;

$a_{12} = -\sin \Theta$;

$a_{21} = \sin \Theta$; and $a_{22} = \cos \Theta$.

The value "$\Theta$" (Theta) is a rotation angle. Because normalized vectors are used, these values may be directly computed by the deformation module 118.

Regardless of a type of graphic manipulation handle at which input 206 is received by deformation module 118 to generate the deformed mesh 208, the deformation module 118 denotes the final position of the handles in final position vector 126. For instance, rest position vector 124 may be denoted as Hi, representative of the graphic deformation handles added by input 204, and final position vector 126 may be denoted as H'i, representative of the final positions of the handles. For each pair of {Hi, H'i}, the multi-state graphic symbol system 104 is provided with Fi(b0, b1, b2)k, where k represents the index of the triangle in the base mesh 122 or deformed mesh 208 containing the handle, and b0, b1, b2 define the barycentric coordinates of the handle within the triangle. In this manner, the multi-state graphic symbol system 104 generates the multi-state symbol 110 to include the outline 120 of the graphic object 106, the base mesh 122, the rest position vector 124, and the final position vector 126, which enables retrieval of different poses of the graphic object 106 from the multi-state symbol 110 without having to store multiple instances or copies of the graphic object 106. In this manner, the multi-state graphic symbol system 104 is configured to generate a multi-state symbol 110 that includes any number of final position vectors 126, each representative of a different pose for the graphic object 106.

The ability of the multi-state graphic symbol system 104 to generate a plurality of final position vectors 126 for a multi-state symbol 110 is illustrated by the dashed arrow returning the deformed mesh to the graphic handle module 116. For instance, in some implementations a user of the multi-state graphic symbol system 104 may desire to create different states, or poses, of the graphic object 106 by first generating the deformed mesh 208 and adding additional handles via input 204 to the deformed mesh 208 for finer modifications that ultimately achieve a desired pose. Accordingly, to maintain fidelity with the graphic object 106, the multi-state graphic symbol system 104 repeatedly performed the biharmonic solve to accommodate iterative handle addition and modification, while maintaining a same number of triangles among the base mesh 122, the deformed mesh 208, and any further deformed mesh generated by adding handles to the deformed mesh 208 and modifying a position of the added handles. Because a same number of triangles are maintained between a base mesh and any deformed meshes generated from the base mesh, the base mesh and resulting deformed mesh(es) may be referred to as isometric meshes.

To enable iterative handle addition, when a new handle $H_{i+1}$ is added to the deformed mesh 208, the graphic handle module 116 computes the corresponding triangle index and barycentric coordinates of the new handle in the deformed mesh 208. To ensure fidelity to the original graphic object 106, the new handle's location is also identified relative to the base mesh 122, as well as relative to the outline 120, using the barycentric information of the base mesh 122. The mesh module 114 then re-computes the base mesh 122 for each iterative addition of a new handle. An example workflow of solving the biharmonic equation to determine weights at each vertex of the base mesh 122 is described in Bounded biharmonic weights for real-time deformation by Alec Jacobson, Ilya Baran, Jovan Popovi'c, and Olga Sorkine, ACM Transactions on Graphics, Volume 30, Issue 4, Article 78, July 2011, the disclosure of which is incorporated herein by reference in its entirety.

For each iterative addition of a handle to the deformed mesh 208, and further deformation of the base mesh, the deformation process computes a new deformed mesh by computing transformation matrices for all handles, combining new weights with the previously determined weights, and generating a new final position vector 126 representative of the new pose of the graphic object 106. This process may be continued for as many iterations as desired to achieve a desired pose, or series of poses, for the graphic object 106. Accordingly, the multi-state symbol 110 may be generated to include an initial pose, denoted by the rest position vector 124, and any number of modified poses, denoted by respective ones of the final position vectors 126. Given this information, the multi-state graphic symbol system 104 can interpolate between any two poses of the graphic object 106, as defined by a pair of final position vectors 126, or a pair of a final position vector 126 and the rest position vector 124. In this manner, the multi-state graphic symbol system 104 ensures minimum overhead computational resource and data storage requirements by sharing the majority of data representation between different poses of the graphic object 106. In the case of interpolating between a subset of handles, as described in further detail below, the interpolation paths may be stored as a set of Bézier splines in the multi-state symbol 110 for each handle in the subset.

Having considered an example system 200, consider now a discussion of example multi-state symbols in accordance with one or more aspects of the disclosure.

Figure 3:
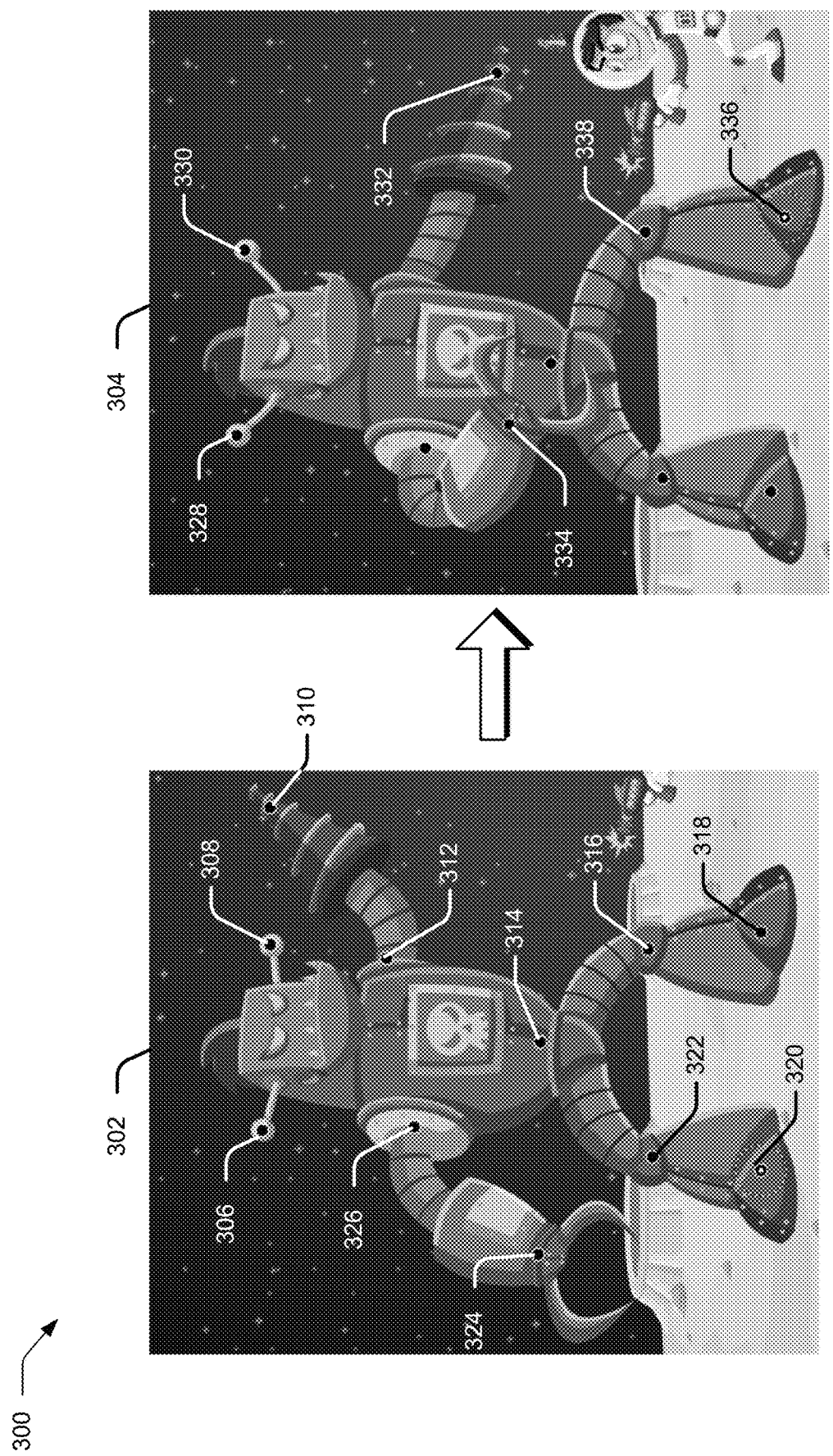
FIG. 3 illustrates the multi-state graphic symbol system of FIG. 1 generating a final position from a rest position of a graphic object in accordance with one or more implementations.

FIG. 3 illustrates an example implementation 300 of the multi-state graphic symbol system 104 generating a multi-state symbol 110 from an input graphic object 106 using the techniques described herein. The illustrated example 300 includes an initial pose 302 of a multi-state symbol and a modified pose 304 of the multi-state symbol. The initial pose 302 of the multi-state symbol, for instance, may correspond to a visual appearance of a graphic object received by the multi-state graphic symbol system 104, such as the graphic object 108 illustrated in FIG. 1. The modified pose 304 of the multi-state symbol may correspond to a state of the graphic object 108 after one or more graphic manipulation handles were added to, and used to deform, the initial pose 302 of the multi-state symbol.

For instance, the initial pose 302 is illustrated as including handles 306, 308, 310, 312, 314, 316, 318, 320, 322, 324, and 326. In some implementations, the handles may be added to initial pose 302 manually via user input, such as via input 204 received by the multi-state graphic symbol system 104 from the input device 202 of FIG. 2. Alternatively or additionally, the handles 306, 308, 310, 312, 314, 316, 318, 320, 322, 324, and 326 may be added automatically via an Auto-Handles tool presented in a user interface of the multi-state graphic symbol system 104. Although illustrated as point handles for simplicity, the handles 306, 308, 310, 312, 314, 316, 318, 320, 322, 324, and 326 are representative of any suitable handle type. For instance, handles 310 and 312 may be representative of endpoints of a spline handle that follows a centerline of the illustrated robot's drill (left) arm. Likewise, handles 324 and 326 may be representative of endpoints of a spline handle that follows a centerline of the illustrated robot's claw (right) arm.

Modified pose 304 is representative of a modified version of the initial pose 302 generated by adjusting a position of one or more of the initial pose 302's handles. For example, handle 328 in the modified pose 304 represents a modified position of handle 306 in the initial pose 302, where a right antenna of the illustrated robot has been moved upward relative to the initial pose 302. Similarly, handle 330 represents a modified position of handle 308 in the initial pose 302, where a left antenna of the illustrated robot has been moved upward relative to the initial pose 302.

Handle 332 represents a modified position of handle 310, where a drill arm of the illustrated robot is lowered relative to the initial pose 302. In an implementation where handles 310 and 312 are endpoints of a spline handle, the modified position illustrated by handle 332 is representative of the effects of weighted handle endpoints. For instance, the weight of handle 310 may be set to "1" and decrease to zero as a gradient (e.g., linearly) that follows the segment (e.g., centerline of the illustrated robot's drill arm) to handle 312, and is set as "0" elsewhere in the base mesh generated for the graphic object including the representation of the illustrated robot, such as graphic object 106 of FIGS. 1 and 2.

Similarly, handle 334 represents a modified position of handle 324, where a claw arm of the illustrated robot is transitioned from an extended position to a bent position. In an implementation where handles 324 and 326 are endpoints of a spline handle, the modified position of handle 334 is representative of how weighted handle endpoints control an extent of deformation relative to other portions of a graphic object. For example, the weight of handle 324 may be set to "1" and decrease to zero as a gradient (e.g., linearly) that follows the segment (e.g., centerline of the illustrated robot's drill arm) to handle 326, and is set as "0" elsewhere in the base mesh generated for the graphic object including the representation of the illustrated robot, such as graphic object 106 of FIGS. 1 and 2. In this manner, input adjusting a position of handles 310 and 324 to their respective modified positions illustrated by handles 332 and 334 results in deformation of the associated spline handles (e.g., the robot's arms) without deforming further portions of the robot, thereby maintaining a similar visual appearance between an initial pose 302 and modified pose 304 of a graphic object.

Based on the respective weights assigned to vertices of a triangular mesh generated for a graphic object, adjusting a position or property of one graphic manipulation handle may deform the graphic object by adjusting a position or property of another graphic manipulation handle. For instance, in the illustrated example 300, input may be received at handle 318 rotating a base mesh of the robot graphic object around the handle 318 in a clockwise direction. This rotational deformation of the illustrated robot results in deformation of the robot's left leg (e.g., the leg of the robot closest to the illustrated spaceman) by causing a position of handle 316 to move to the position indicated by handle 338. Such a rotational deformation may also result in causing a heel of the robot's left foot to lift from a base of the frame of modified pose 304 while causing a toe of the robot's left foot to move closer to the base of the frame of modified pose 304. Multiple different inputs may be received at a handle to deform an associated graphic object. For instance, in addition to an input rotating handle 318 in a clockwise direction, a position of the handle 318 may be adjusted to a modified position as illustrated by handle 336, relatively closer to the spaceman. Conversely, one or more handles of a graphic object may control deformation of the graphic object independent of receiving input at the one or more handles. For example, handles 314, 320, and 322 of the initial pose 302 may be configured as anchor handles, which do not change position while the illustrated robot is being deformed. Thus, graphic manipulation handles can be implemented by the multi-state graphic symbol system 104 to control a manner in which a graphic object 106 is deformed from an initial pose to achieve one or more different poses for inclusion in a multi-state symbol 110.

Having considered an example of deforming a graphic object using one or more graphic manipulation handles, consider an example of generating a triangular base mesh for a graphic object and mapping handles to barycentric coordinates of respective triangles of the triangular base mesh.

FIG. 4 illustrates an example implementation 400 of generating a base mesh for a graphic object, deforming the base mesh to generate a deformed mesh using one or more graphic manipulation handles, adding at least one graphic manipulation handle to the deformed mesh, and mapping the graphic manipulation handles of the deformed mesh to respective positions of the base mesh.

Specifically, the example implementation 400 includes box 402, which includes a graphic object illustrating a man with a beard wearing a hat and glasses on a gray background, bounded by a star-shaped border. Thus, the star-shaped border of graphic object 402 illustrates an outline for the graphic object, such as outline 120 for graphic object 106, as illustrated in FIGS. 1 and 2. Thus, a graphic object as described herein may include any one or combination of elements, such as portions of a foreground of an image, portions of a background of an image, combinations thereof, and so forth.

Box 404 illustrates the graphic object of box 402, along with a triangular mesh 408 that has been generated for the graphic object. The triangular mesh 408 is an example of a mesh that can be generated by mesh module 114 of FIGS. 1 and 2, such as the base mesh 122. As illustrated in box 404, the triangle mesh covers all portions of the graphic object bounded by the star-shaped border. Samples of curves of the graphic object can be bound to the triangular mesh 408 by mesh module 114 of the multi-state graphic symbol system 104, which enables deformation of the samples when the triangular mesh is deformed by dragging a handle of the triangular mesh 408, such as handle 410. Information describing any handles added to triangular mesh 408 is compiled to generate a rest position vector for the graphic object, such as rest position vector 124, as illustrated in FIGS. 1 and 2.

For instance, box 406 illustrates a deformed version of the graphic object illustrated in box 402. Box 406 includes a deformed mesh 420, which is a deformed version of the triangular mesh 408. Deformed mesh 420 is an example of a deformed mesh generated by deformation module 118 of FIGS. 1 and 2, such as the deformed mesh 208. In the illustrated example of FIG. 4, deformed mesh 420 is generated by selecting and dragging handle 412 downward, to "stretch" a prong of the star representing an outline of the graphic object illustrated in box 402. Responsive to input dragging handle 412, such as input 206 received from input device 202 in FIG. 2, the triangle mesh 408 is deformed into deformed mesh 420, and the graphic object's illustration of the man is deformed according to the deformed mesh 420. For instance, the man's beard of the graphic object illustrated in box 402 has been deformed (e.g., stretched) together with deformed mesh 420. The deformed version of the graphic object illustrated in box 406 may be saved as a pose, together with a base pose as illustrated in box 402, for inclusion in a multi-state symbol, such as in multi-state symbol 110 of FIGS. 1 and 2. Saving the deformed version of the graphic object illustrated in box 406 may be performed by generating a final position vector describing a position of graphic manipulation handles that were modified to generate the deformed mesh 420, such as in final position vector 126, as illustrated in FIGS. 1 and 2.

To enable further deformation of the deformed mesh 420 and generation of additional poses for the base graphic object illustrated in box 402, the multi-state graphic symbol system 104 enables for the addition of graphic manipulation handles to the deformed mesh 420. For example, graphic manipulation handles 414, 416, and 418 may be added to the deformed mesh 420 and subsequently dragged, rotated, etc. to generate a further deformed mesh, which dictates a further deformation of the graphic object illustrated in box 402. In order to update the base triangular mesh generated for the graphic object illustrated in box 402, the handles 414, 416, and 418 are mapped to the triangular mesh 408 to determine relative positions of the handles 414, 416, and 418 in the triangular mesh 408, and a base mesh (e.g., the triangular mesh 408) for the graphic object 402 is recomputed. In this manner, subsequent deformation of the deformed mesh 420 can be summarized by a final position vector describing a final position of the handles 414, 416, and 418.

Because the base triangular mesh 408 is recomputed to include information describing a relative position of the handles 414, 416, and 418 as they would have existed in the base triangular mesh 408, the multi-state graphic symbol system 104 generates a multi-state symbol for a graphic object of box 402 without requiring storage of multiple copies of the graphic object, such as one copy of the graphic object for each deformed pose of the graphic object. Thus, the multi-state graphic symbol system 104 is configured to generate a multi-state symbol 110 for a graphic object that includes information describing an outline of the graphic object, a base mesh for the graphic object, a rest position vector describing handle positions relative to the base mesh, and one or more final position vectors that each describe different locations of the handles relative to respective deformed meshes generated from the base mesh. As such, the multi-state symbol 110 for a graphic object requires minimal data storage by sharing a majority of the data representation for different poses of the multi-state symbol 110. In this manner, the multi-state symbol 110 can be transmitted in a content delivery pipeline among computing devices using minimal computational resources, while enabling generation of any number of poses for the graphic object represented by multi-state symbol 110.

Figure 5:
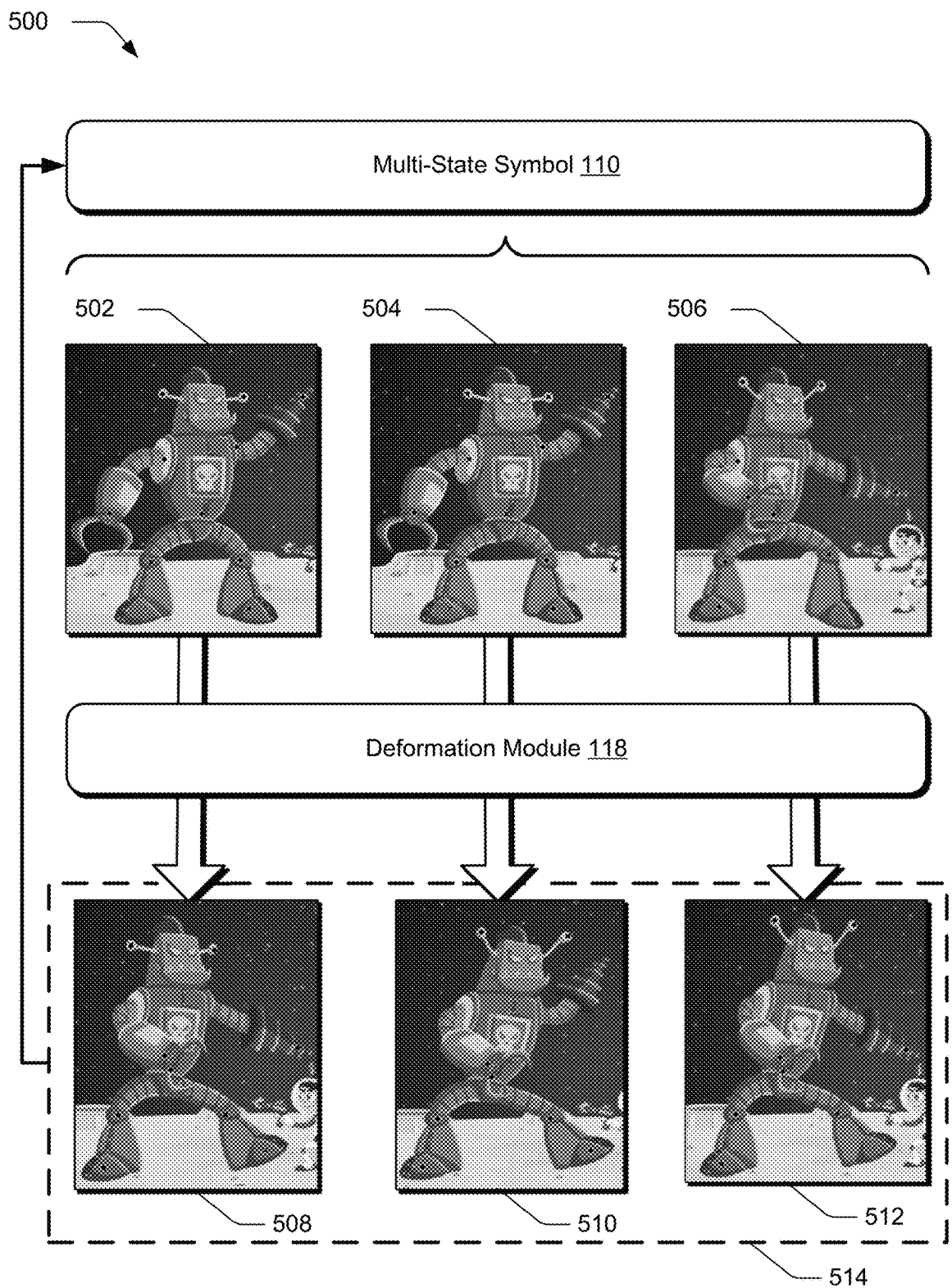
FIG. 5 illustrates examples of generating a final position from a base position of a graphic object using the multi-state graphic symbol system of FIG. 1 in accordance with one or more implementations.

FIG. 5 illustrates an example implementation 500 of generating various different poses for a multi-state symbol 110, given an initial pose defined by an outline, base mesh, and rest position vector for the multi-state symbol 110 and a final pose defined by a final position vector of the multi-state symbol 110. For instance, in the illustrated example 500, poses 502 and 504 are representative of an initial pose of the multi-state symbol 110, such as pose 128 of graphic object 106 as illustrated in FIG. 1. Likewise, pose 506 is representative of a final pose of the multi-state symbol 110, such as pose 130 of graphic object 106, as illustrated in FIG. 1.

Through the addition of one or more graphic manipulation handles, and subsequent modification of at least one added graphic manipulation handles, each of the poses 502, 504, and 506 can be modified by deformation module 118 of the multi-state graphic symbol system 104 to generate a new, modified pose of the graphic object represented by multi-state symbol 110. In some implementations, multiple poses of the multi-state symbol 110 may be generated simultaneously in a single user interface for the multi-state graphic symbol system 104, such as for creating an animation storyboard that includes a sequence of different poses for the multi-state symbol 110.

For example, a computing device implementing the multi-state graphic symbol system 104 may output display of a user interface that simultaneously includes poses 502, 504, and 506 of the multi-state symbol 110. Upon receiving input modifying each of the poses 502, 504, and 506, the deformation module 118 is configured to generate modified poses 508, 510, and 512, respectively. Deformation module 118, for instance, may receive input 206 modifying at least one graphic manipulation handle for each of the poses 502, 504, and 506. Because graphic manipulation handles added to any of the poses 502, 504, 506, 508, 510, and 512 are mapped back to a base mesh of the multi-state symbol 110, each pose can be modified independent of affecting a different pose displayed in the user interface of the multi-state graphic symbol system 104.

Each of the modified poses 508, 510, and 512 can be represented as a final position vector, which describes a final position of graphic manipulation handles as they exist in the modified pose 508, 510, or 512. Final position vectors representing the modified poses 508, 510, and 512 can be combined into a group of final position vectors denoted by the dashed outline 514 and stored in the multi-state symbol 110, such as stored in final position vectors 126, as illustrated in FIG. 1. In this manner, the multi-state graphic symbol system 104 enables generation of any number of modified poses for the multi-state symbol 110 in a manner that minimizes an amount of data storage required to maintain the multi-state symbol 110 by describing modified poses using final position vectors and sharing a data representation of an underlying graphic object. Using the techniques described herein, the multi-state graphic symbol system 104 additionally enables generation of a new pose for a multi-state symbol 110 by interpolating between different poses defined by a rest position vector and/or final position vectors of the multi-state symbol 110.

FIG. 6 illustrates an example implementation 600 of the multi-state graphic symbol system 104 generating a new pose for a multi-state symbol by interpolating between different poses of the multi-state symbol using the techniques described herein. In the illustrated example, the multi-state graphic symbol system 104 is configured to interpolate between a first pose 602 and a second pose 604 of a multi-state symbol to generate an interpolated pose 606.

In the illustrated example, the first pose 602 includes a skateboarding dinosaur with three graphic manipulation handles: handle 608 positioned at a snout of the dinosaur, handle 610 positioned at a chin of the dinosaur, and handle 612 positioned at a tip of the dinosaur's tail. The second pose 604 represents a modification of the skateboarding dinosaur via repositioning of the handles 608, 610, and 612 to positions indicated at locations 614, 616, and 618, respectively. In an example implementation, the first pose 602 may be representative of a rest position vector 124 and the second pose 604 may be representative of a final position vector 126 for a multi-state symbol 110, as illustrated in FIG. 1.

To facilitate generation of the interpolated pose 606, the multi-state graphic symbol system 104 is configured to output display of interpolation slider 620, which can be slid along the corresponding line to adjust respective positions of the handles 608, 610, and 612. For instance, moving the interpolation slider 620 to a left-most position of the corresponding line may cause the interpolated pose 606 to be identical to the first pose 602, while moving the interpolation slider 620 to a right-most position of the corresponding line may cause the interpolated pose 606 to be identical to the second pose 604. In this manner, positioning the interpolation slider 620 in between the left-most and right-most positions causes the deformation module 118 of the multi-state symbol system 104 to generate a multi-state symbol pose that includes graphic manipulation handles positioned between their corresponding locations in first pose 602 and second pose 604. Although illustrated and described with respect to a slider control, interpolation slider 620 is representative of any suitable control for designating an interpolation value, such as a scrollable wheel, a numerical prompt for an interpolation percentage, combinations thereof, and so forth.

For example, interpolated pose 606 includes handle 608 positioned at location 622, which is representative of an interpolated position of handle 608 between its initial position in first pose 602 and position 614 in second pose 604. Similarly, interpolated pose 606 includes handle 610 positioned at location 624, which is representative of an interpolated position of handle 610 between its initial position in first pose 602 and position 616 in second pose 604. Finally, interpolated pose 606 includes handle 612 positioned at location 626, which is representative of an interpolated position of handle 612 between its initial position in first pose 602 and position 618 in second pose 604. Computation of a handle's interpolated position is performed by deformation module 118 based on an interpolation amount, t, which is a value between zero and one, inclusive, with a value of zero corresponding to the first pose 602 and a value of one corresponding to the second pose 604. For each handle $h_i$ being interpolated, deformation module computes a position of the handle as follows:

$$h(t)_i = (1-t)*H_i + t*H'_i,$$

where $H_i$ corresponds to the handle's position in first pose 602 and $H'_i$ corresponds to the handle's position in second pose 604.

Although the illustrated example 600 includes interpolating each graphic manipulation handle of the first pose 602 and second pose 604, in some implementations only a subset of handles may be interpolated to generate interpolated pose 606. For instance, the multi-state graphic symbol system 104 may enable selection of one or more handles to be interpolated based on input to the interpolation slider 620 and abstain from interpolating non-selected handles. In some implementations, interpolation of handle positions between different states of a multi-state symbol is performed in a linear fashion, such that a position of a handle traverses a straight line between initial and final positions of the handle during interpolation. In addition to linear interpolation, the multi-state graphic symbol system 104 is configured to enable handle interpolation along non-linear paths.

Figure 7:
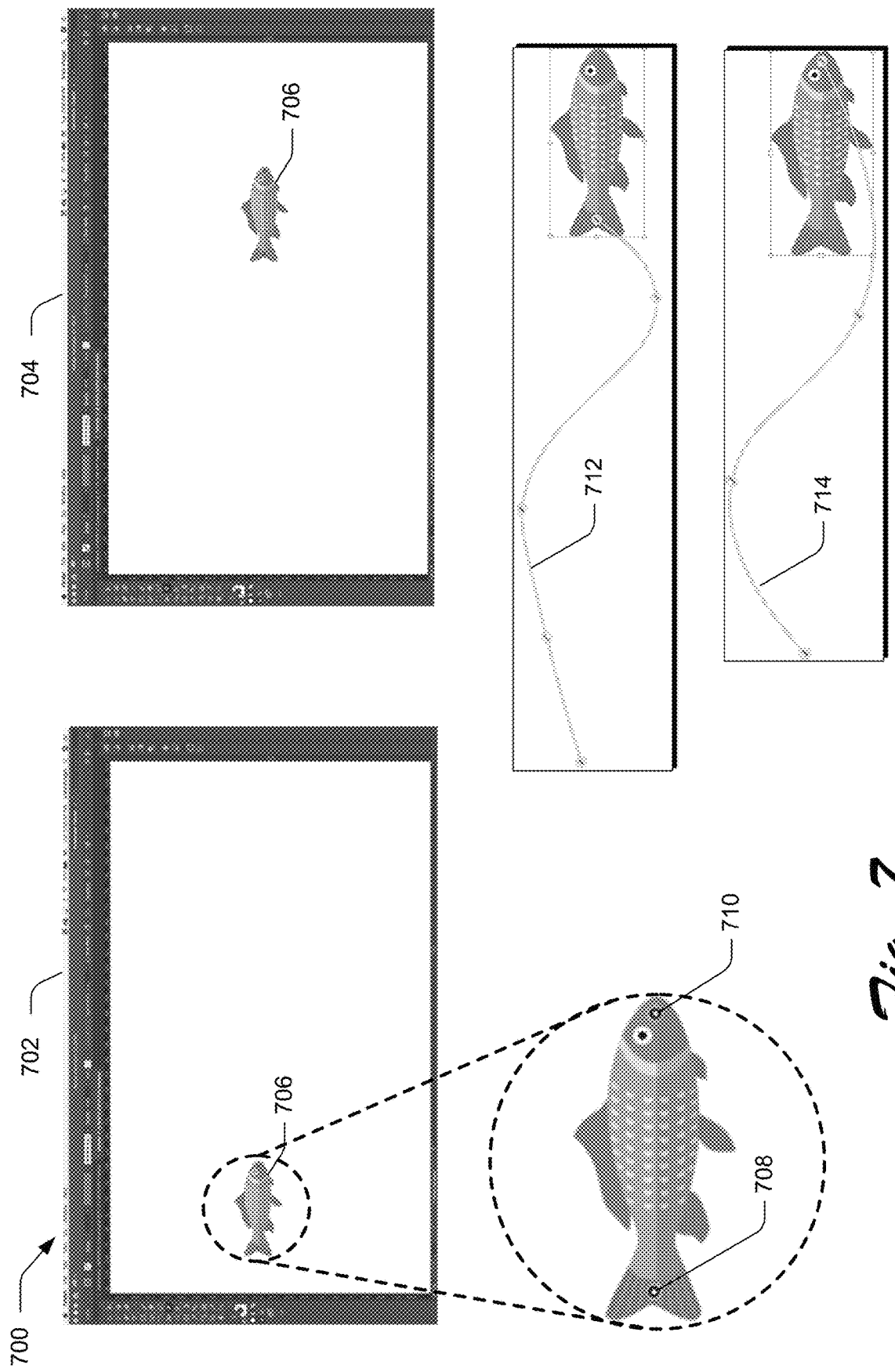
FIG. 7 illustrates example user interfaces for the multi-state graphic symbol system of FIG. 1 in accordance with one or more implementations.

FIG. 7 illustrates an example implementation 700 of the multi-state graphic symbol system 104 interpolating between different poses of a multi-state symbol 110 along non-linear paths in using the techniques described herein. The illustrated example is representative of the deformation module 118 generating a new pose for a graphic object 106 used to generate the multi-state symbol 110 in accordance with one or more implementations. For instance, the illustrated example includes a first pose 702 and a second pose 704 of a fish graphic object 706. In the first pose 702, the graphic object 706 is positioned in a left portion of a frame, while the second pose 704 includes the graphic object 706 positioned in a right portion of the frame. The graphic object 706 is further illustrated as including graphic manipulation handles 708 and 710, with handle 708 corresponding to a tail of the fish graphic object 706 and handle 710 corresponding to a nose of the fish graphic object 706.

In addition to enabling linear interpolation between respective positions of the handles 708 and 710 in the first pose 702 and the second pose 704, the multi-state graphic symbol system 104 enables specification of an interpolation path for each of handles 708 and 710. For example in a scenario where a user wishes to animate the fish graphic object 706 to simulate "swimming" of the graphic object 706 between its respective positions in first pose 702 and second pose 704, the user may specify a first interpolation path 712 for handle 708 and a second interpolation path 714 for handle 710. The interpolation paths 712 and 714 may each be defined as any suitable path, and may be input via drawing as a freeform line, via selection as a set of curves, via selection of a recommended interpolation path, and so forth. Input defining an interpolation path for a graphic manipulation handle may be specified via input 206 to the deformation module 118, as illustrated in FIG. 2. Upon receiving input defining an interpolation path for a graphic manipulation handle of a multi-state symbol 110, the multi-state graphic symbol system 104 stores the interpolation path in metadata of the multi-state symbol 110 along with an indication of a rest position vector 124 or final position vector 126 corresponding to a beginning of the interpolation path and an indication of a rest position vector 124 or final position vector 126 corresponding to an end of the interpolation path.

To interpolate handles 708 and 710 along their respective interpolation paths 712 and 714, the multi-state graphic symbol system 104 maps a parametric interval, spanning zero to one, to the length of each interpolation path. Using this mapping, for each interpolation path, the multi-state graphic symbol system 104 identifies a cubic Bezier segment for the interpolation path and uses the interpolation path to find the intermediate position of the respective handle 708, 710 during interpolation. For instance, for each handle $h_i$ being interpolated, deformation module computes a position of the handle as follows:

$$h(t)_i = (1-t)*H_i + t*H'_i,$$

where $H_i$ corresponds to the handle's position in first pose 602, $H'_i$ corresponds to the handle's position in second pose 604, and $h(t)_i$ indicates coordinates for the handle's interpolated along the Bezier segment for the interpolation path. In some implementations, interpolation of the graphic object 706 along interpolation paths 712 and 714 is facilitated by an interpolation control, such as interpolation slider 620 of FIG. 6. In this manner, multi-state graphic symbol system 104 is configured to generate a multi-state symbol 110 that includes any number of different poses, which can be iteratively modified and interpolated between to generate new poses of an underlying original graphic object while maintaining visual fidelity to the original and without requiring duplication of data describing the graphic object.

Having discussed example details of the techniques for generating a multi-state symbol, consider now some example procedures to illustrate additional aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-7.

Figure 8:
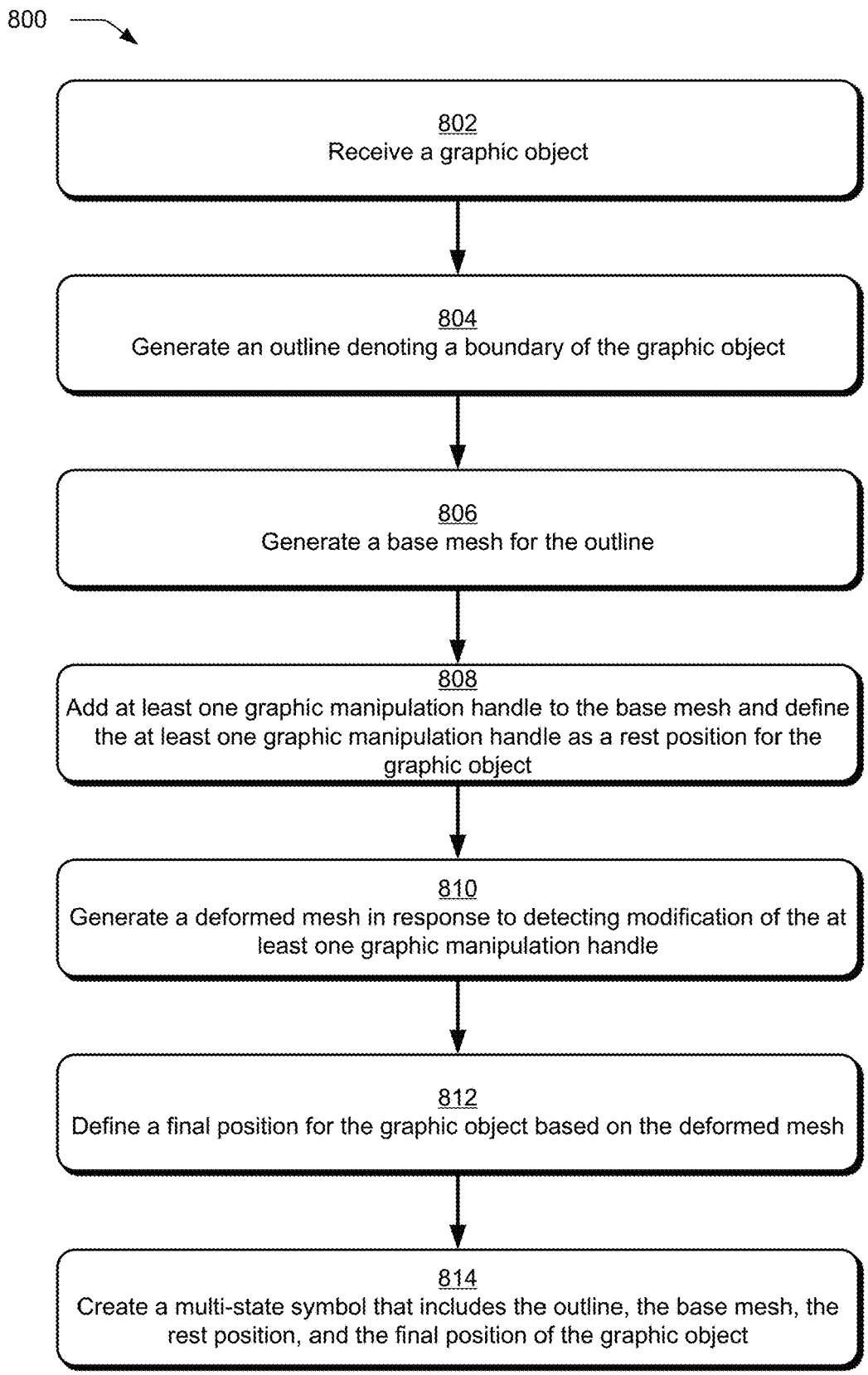
FIG. 8 is a flow diagram depicting a procedure in an example implementation for generating a multi-state symbol using the techniques described herein.

FIG. 8 depicts a procedure 800 in an example implementation of generating a multi-state symbol from an input graphic object using the techniques described herein. A graphic object is received (block 802). The computing device implementing the multi-state graphic symbol system 104, for instance, receives the graphic object 106 from which the multi-state symbol 110 is to be generated.

In response to receiving the graphic object, an outline is generated denoting a boundary of the graphic object (block 804). The outline module 112 of the multi-state graphic symbol system 104, for instance, generates outline 120 denoting a boundary of the graphic object 106, such as an outline of the illustrated robot 108 of FIG. 1.

Upon generating the outline for the graphic object, a base mesh is generated for the outline (block 806). The mesh module 114 of the multi-state graphic symbol system 104, for instance, generates base mesh 122. In some implementations, the base mesh 122 is generated as a triangular mesh, such as mesh 408 illustrated in FIG. 4. In one implementation the base mesh 122 is represented using triplets of vertices (e.g., coordinates of vertices), where each triplet represents a triangle in the mesh. Additionally or alternatively, a list of vertices of the base mesh 122 and their locations (e.g., coordinates) can be generated by the mesh module 114, and each triangle in the base mesh can be represented by a triplet of indices of vertices (e.g., numbers on the list of vertices). In this implementation, coordinates of the vertices can be determined from the list of vertices for the base mesh 122. Upon generating the base mesh 122, mesh module 114 binds segments of the graphic object 106 to respective portions of the base mesh 122.

After generating the base mesh for the graphic object, at least one graphic manipulation handle is added to the base mesh and the at least one graphic manipulation handle is used to define a rest position for the graphic object (block 808). The graphic handle module 116 of the multi-state graphic symbol system 104, for instance, is configured to receive input, such as input 204, specifying at least one graphic manipulation handle to be added to the base mesh 122. A graphic manipulation handle added to the base mesh 122 by the graphic handle module 116 may be any suitable type of graphic manipulation handle, such as a point, a bone handle, a point handle, a cage handle, a spline handle, combinations thereof, and so forth. For each graphic manipulation handle generated by the graphic handle module 116, the base mesh 122 is updated such that the base mesh 122 includes information describing barycentric coordinates of the graphic manipulation handle. The graphic handle module 116 stores information describing graphic manipulation handles added to the base mesh 122 as rest position vector 124.

In response to detecting modification of the at least one graphic manipulation handle, a deformed mesh is generated (block 810). The deformation module 118 of the multi-state graphic symbol system 104, for instance, receives input 206 adjusting a position, or modifying a property, of a graphic manipulation handle added to base mesh 122 and generates deformed mesh 208. For example, a deformed mesh 420 may be generated from a base mesh 408 in response to receiving input dragging handle 412 downward, as illustrated in block 406 of FIG. 4. A modified pose of the graphic object 106 may be generated based on the deformed mesh 208 by mapping segments of the graphic object to respective portions of the deformed mesh 208.

Based on the deformed mesh, a final position for the graphic object is determined (block 812). The deformation module 118 of the multi-state graphic symbol system 104, for instance, identifies a position of one or more graphic manipulation handles in the deformed mesh 208 and generates a final position vector 126 describing the position of the one or more graphic manipulation handles.

A multi-state symbol is then created that includes information describing the outline, the base mesh, the rest position, and the final position of the graphic object (block 814). The multi-state graphic symbol system 104, for instance, generates multi-state symbol 110 with included information describing the outline 120 the base mesh 122, the rest position vector 124, and the final position vector 126. In implementations where multiple different poses of the graphic object 106 were created by the multi-state graphic symbol system 104, the multi-state symbol 110 may be generated as including a plurality of different final position vectors 126, one for each different pose of the graphic object 106.

FIG. 9 depicts a procedure 900 in an example implementation of adding a graphic manipulation handle to a deformed mesh for a graphic object and updating a base mesh for the graphic object to reflect the addition of the added graphic manipulation handle using the techniques described herein. A deformed triangular mesh generated by modifying a geometry of a base triangular mesh for a graphic object is output (block 902). The multi-state graphic symbol system 104, for instance, outputs deformed mesh 420, which was generated from base mesh 408 in response to receiving input dragging handle 412 downward, as illustrated in block 406 of FIG. 4. In some implementations, outputting deformed mesh 420 is performed in a manner that does not display the individual triangles of the deformed mesh. For example, the deformed graphic object illustrated in block 406 of FIG. 4 may be output without displaying the triangular mesh 420 itself.

A graphic manipulation handle is then added to the deformed mesh, and a triangle of the deformed triangular mesh that includes the graphic manipulation handle is identified (block 904). The graphic handle module 116, for instance, receives input 204 specifying one or more handles to be added to the deformed mesh 208, such as handles 412, 414, 416, and 418 of FIG. 4's deformed mesh 420. The input may be received in a variety of manners, such as via one of the input/output interfaces described in further detail below with respect to FIG. 11. A triangle that includes the added graphic manipulation handle may be identified based on an index value denoting individual triangles of the deformed mesh 208.

After adding the graphic manipulation handle to the deformed mesh, coordinates for the graphic manipulation handle relative to the triangle that includes the added graphic manipulation handle are determined (block 906). The graphic handle module 116, for instance, computes the corresponding triangle index and barycentric coordinates of the new handle in the deformed mesh 208. Barycentric coordinates are a set of numbers that are useable to uniquely describe a location of a point in a triangle, with respect to the vertices of the triangle.

Using the barycentric coordinates of the added graphic manipulation handle relative to the identified triangle of the deformed mesh, a location for the graphic manipulation handle within a corresponding triangle of the base triangular mesh is determined (block 908). For example, when a new handle $H_{i+1}$ is added to the deformed mesh 208, the graphic handle module 116 computes the corresponding triangle index and barycentric coordinates of the new handle in the deformed mesh 208. To ensure fidelity to the original graphic object 106, the new handle's location is also identified relative to the base mesh 122, as well as relative to the outline 120, using the barycentric information of the base mesh 122. The mesh module 114 then re-computes the base mesh 122 for each iterative addition of a new handle and solves the biharmonic equation to determine weights at each vertex of the base mesh 122. The base triangular mesh is then updated to include the added graphic manipulation handle and information describing the computed biharmonic weights for each vertex of the base triangular mesh to reflect the addition of the graphic manipulation handle to the deformed mesh (block 910). In this manner, the multi-state graphic symbol system 104 enables for subsequent deformation and consequent generation of new poses for a graphic object in a manner that preserves visual properties of the original graphic object, even in scenarios involving multiple modification iterations.

Figure 10:
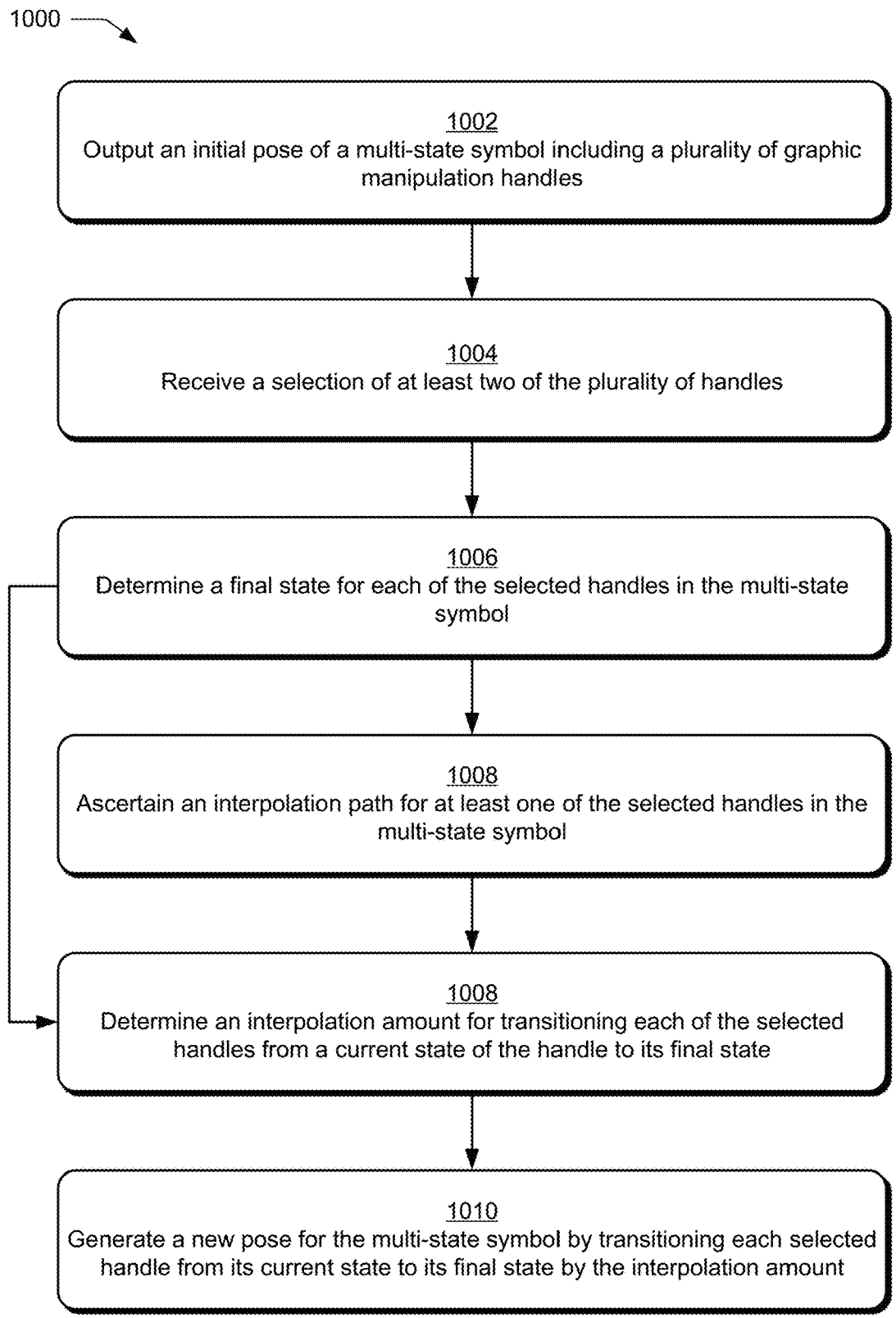
FIG. 10 is a flow diagram depicting a procedure in an example implementation for generating a new pose of a graphic object by interpolating between a rest position and a final position using the techniques described herein.

FIG. 10 depicts a procedure 1000 in an example implementation of generating a new pose for a multi-state symbol by interpolating between two poses of the multi-state symbol using the techniques described herein. An initial pose of a multi-state symbol including a plurality of graphic manipulation handles is output (block 1002). The multi-state graphic symbol system 104, for instance, outputs a first pose 602 of a graphic object including graphic manipulation handles 608, 610, and 612, as illustrated in FIG. 6.

A selection of at least two of the plurality of handles is then received (block 1004). For example, input selecting the graphic manipulation handles 608, 610, and 612 is received by the deformation module 118 of the multi-state graphic symbol system 104. In some implementations, the received input may select all handles included in the first pose 602. Alternatively, the received input may select a subset, but not all, handles included in the first pose 602. The input may be received in a variety of manners, such as via one of the input/output interfaces described in further detail below with respect to FIG. 11.

After receiving a selection of at least two of the plurality of handles included in the first pose 602, a final state is determined for each selected handle (block 1006). The multi-state graphic symbol system 104, for instance, identifies a final pose for the graphic object, such as second pose 604 as illustrated in FIG. 6. Continuing the example implementation where each of handles 608, 610, and 612 are selected for interpolation, deformation module 118 of the multi-state graphic symbol system 104 identifies a final state, such as a final position for each of handles 608, 610, and 612 indicated by positions 614, 616, and 618, respectively, in second pose 604.

Input is received defining an interpolation path for at least one of the selected handles in the multi-state symbol (block 1008). Input defining an interpolation path for a handle is optional, as indicated by the arrow circumventing block 1008. The deformation module 118 of the multi-state graphic symbol system 104, for instance, receives input specifying interpolation path 712 for graphic manipulation handle 708 of graphic object 706 from an initial pose 702 to a final pose 704, as illustrated in FIG. 7. Additionally or alternatively, deformation module 118 receives input specifying interpolation path 714 for graphic manipulation handle 710 of graphic object 706 from an initial pose 702 to a final pose 704, as illustrated in FIG. 7.

An interpolation amount for transitioning each of the selected handles from the handle's current state to its final state is then determined (block 1008). The deformation module 118 of the multi-state graphic symbol system 104, for instance, receives input at the interpolation slider 620 illustrated in FIG. 6, specifying an interpolation amount for transitioning from the first pose 602 to the second pose 604 of the multi-state symbol. The interpolation amount may specify a numerical value between zero and 1, inclusive, which defines a percentage amount along an interpolation path for each selected handle which the selected handle is to be moved, rotated, scaled, or otherwise adjusted towards the characteristics of the handle as defined by the final pose of the multi-state symbol.

A new pose for the multi-state symbol is then generated by transitioning each selected handle from its current state to its final state by the interpolation amount (block 1010). The deformation module 118 of the multi-state graphic symbol system 104, for instance, generates interpolated pose 606 by transitioning handles 608, 610, and 612 from their current states as illustrated in pose 602 towards their final states as indicated in pose 604 by an interpolation amount specified via input to the interpolation slider 620. Information describing the selected handles as they exist in the interpolated pose 606 is used to generate a final position vector 126 representing the interpolated pose 606 and stored in the multi-state symbol 110, such that the interpolated pose 606 becomes a defined pose in the multi-state symbol 110 representing graphic object 106.

Having described example procedures in accordance with one or more implementations, consider now an example system and device that can be utilized to implement the various techniques described herein.

Example System and Device

Figure 11:
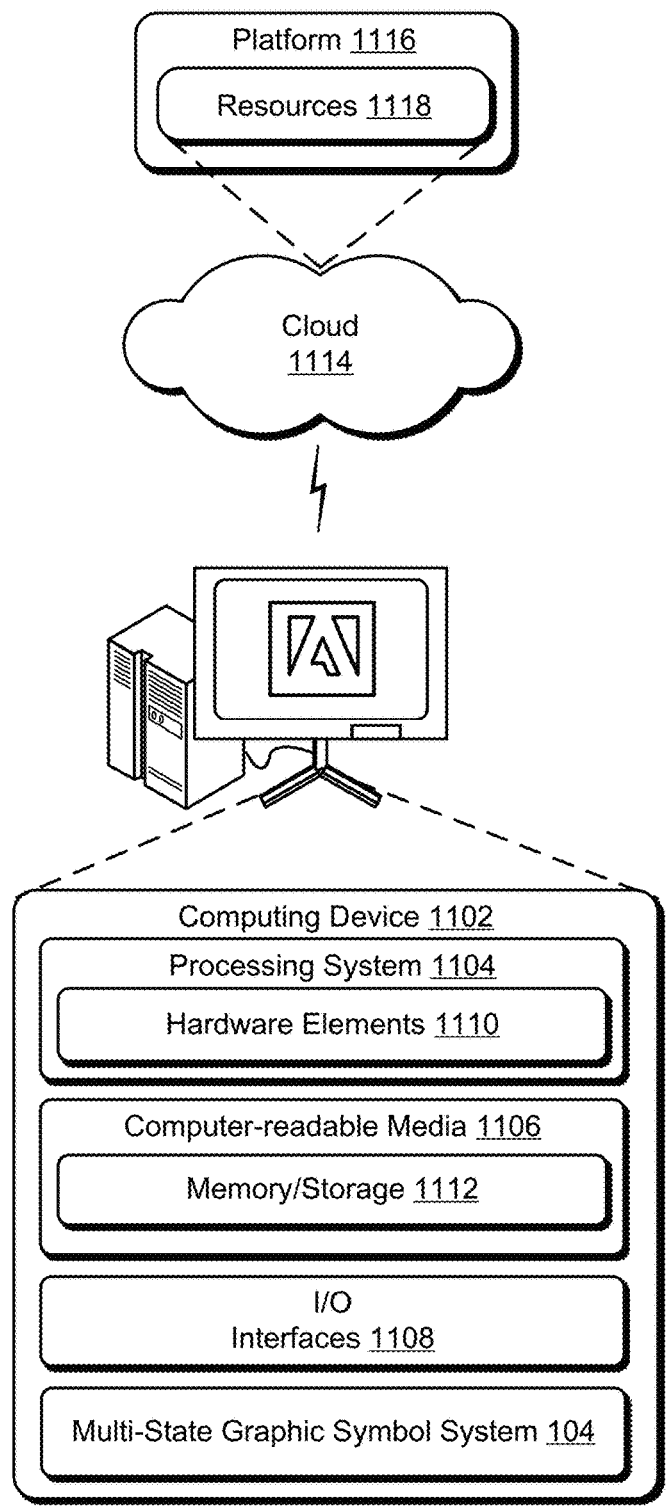
FIG. 11 illustrates an example system including various components of an example device that can be implemented as a computing device as described and/or utilized with reference to FIGS. 1-10 to implement the techniques described herein.

FIG. 11 illustrates an example system generally at 1100 that includes an example computing device 1102 that is representative of one or more computing systems and/or devices that may implement the various techniques described herein. This is illustrated through inclusion of the multi-state graphic symbol system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a multi-state symbol from a graphic object that includes information describing multiple different poses of the graphic object, a method implemented by at least one computing device, the method comprising:
displaying, by the at least one computing device, the graphic object with a graphic manipulation handle, the graphic object being defined by an outline and a triangular base mesh and a state of the graphic manipulation handle being defined by a rest position vector;
detecting, by the at least one computing device, input modifying the state of the graphic manipulation handle, wherein the graphic manipulation handle being configured to cause deformation of the triangular base mesh in response to input modifying the state of the graphic manipulation handle; and
responsive to detecting the input modifying the state of the graphic manipulation handle:
determining, by the at least one computing device, a final position vector defining a modified state of the graphic manipulation handle; and
outputting, by the at least one computing device, a multi-state symbol for the graphic object, the multi-state symbol comprising information describing the outline, the triangular base mesh, the rest position vector, and the final position vector.

2. A method as described in claim 1, wherein a geometry of the graphic object is defined by cubic Bezier splines and the outline denotes a boundary of the graphic object enclosed by connected polylines.

3. A method as described in claim 1, wherein the state of the graphic manipulation handle comprises information describing at least one of a rotational value of the graphic manipulation handle or a scale value of the graphic manipulation handle.

4. A method as described in claim 1, further comprising adding the graphic manipulation handle to the triangular base mesh in response to receiving user input defining a position for the graphic manipulation handle relative to the triangular base mesh or automatically in response to receiving input selecting an automatic handle generation tool and independent of additional user intervention.

5. A method as described in claim 1, wherein the graphic manipulation handle is an anchor handle, a point handle, a line handle, or a Bezier spline handle.

6. A method as described in claim 1, further comprising generating a deformed triangular mesh in response to detecting the input modifying the state of the graphic manipulation handle, the triangular base mesh including a plurality of triangle primitives and the deformed triangular mesh including a same number of triangle primitives as the plurality of triangle primitives.

7. A method as described in claim 6, further comprising adding, by the at least one computing device, an additional graphic manipulation handle to the deformed triangular mesh and updating, by the at least one computing device, the triangular base mesh by mapping the additional graphic manipulation handle to a location in a corresponding one of the plurality of triangle primitives of the triangular base mesh.

8. A method as described in claim 7, further comprising generating, by the at least one computing device, a new pose for the graphic object of the multi-state symbol by deforming the deformed triangular mesh in response to receiving input at the additional graphic manipulation handle and embedding an additional final position vector in the multi-state symbol that describes the new pose.

9. A method as described in claim 1, further comprising generating, by the at least one computing device, an interpolated pose for the graphic object of the multi-state symbol by determining barycentric coordinates of graphic manipulation handles of the interpolated pose using an interpolation value for transitioning between the rest position vector and the final position vector and mapping the outline and the triangular base mesh to the barycentric coordinates of the graphic manipulation handles of the interpolated pose.

10. A method as described in claim 1, wherein the state of the graphic manipulation handle comprises information describing a position of the graphic manipulation handle.

11. In a digital medium environment to generate a multi-state symbol from a graphic object that includes information describing multiple different poses of the graphic object, a method implemented by at least one computing device, the method comprising:
displaying, by the at least one computing device, the graphic object with a graphic manipulation handle, the graphic object being defined by an outline and a triangular base mesh and a state of the graphic manipulation handle being defined by a rest position vector;

responsive to detecting a modification to the state of the graphic manipulation handle:

determining, by the at least one computing device, a final position vector defining a modified state of the graphic manipulation handle; and generating a deformed triangular mesh for the graphic object having the modified state of the graphic manipulation handle, the triangular base mesh including a plurality of triangle primitives and the deformed triangular mesh including a same number of triangle primitives as the plurality of triangle primitives;

receiving, by the at least one computing device, input adding a graphic manipulation handle to the deformed triangular mesh and updating the triangular base mesh to reflect the additional graphic manipulation handle; and outputting, by the at least one computing device, a multi-state symbol for the graphic object, the multi-state symbol comprising information describing the outline, the updated triangular base mesh, the deformed triangular mesh, the rest position vector, and the final position vector.

12. A method as described in claim 11, wherein updating the triangular base mesh to reflect the additional graphic manipulation handle comprises determining a location of the additional graphic manipulation handle relative to the triangular base mesh and determining biharmonic weights for each vertex of the triangular base mesh based on the location of the additional graphic manipulation handle relative to the triangular base mesh.

13. A method as described in claim 12, further comprising:

identifying, by the at least one computing device, a triangle of the deformed triangular mesh that includes the additional graphic manipulation handle; and determining, by the at least one computing device, barycentric coordinates for the additional graphic manipulation handle within the triangle of the deformed triangular mesh, wherein determining the location of the additional graphic manipulation handle relative to the triangular base mesh is performed using the barycentric coordinates.

14. A method as described in claim 12, further comprising receiving, by the at least one computing device, input adjusting a position of the additional graphic manipulation handle and further deforming the triangular base mesh based on the biharmonic weights for each vertex of the triangular base mesh.

15. A method as described in claim 11, further comprising receiving, by the at least one computing device, information describing a state of the additional graphic manipulation handle and updating the triangular base mesh based on the state of the additional graphic manipulation handle, the state of the additional graphic manipulation handle describing at least one of a position of, a rotational value of, or a scale value of the additional graphic manipulation handle.

16. In a digital medium environment to generate a multi-state symbol from a graphic object that includes information describing multiple different poses of the graphic object, a system comprising:

one or more processors; and a computer-readable storage medium having instructions stored thereon that are executable by the one or more processors to perform operations comprising:

displaying the graphic object with a graphic manipulation handle, the graphic object being defined by an outline and a triangular base mesh and a state of the graphic manipulation handle being defined by a rest position vector;

detecting input modifying the state of the graphic manipulation handle; and responsive to detecting the input modifying the state of the graphic manipulation handle:

determining a final position vector defining a modified state of the graphic manipulation handle; and outputting a multi-state symbol for the graphic object, the multi-state symbol comprising information describing the outline, the triangular base mesh, the rest position vector, and the final position vector.

17. A system as described in claim 16, the operations further comprising generating a deformed triangular mesh in response to detecting the input modifying the state of the graphic manipulation handle, the triangular base mesh including a plurality of triangle primitives and the deformed triangular mesh including a same number of triangle primitives as the plurality of triangle primitives.

18. A system as described in claim 17, the operations further comprising adding an additional graphic manipulation handle to the deformed triangular mesh and updating the triangular base mesh by mapping the additional graphic manipulation handle to a location in a corresponding one of the plurality of triangle primitives of the triangular base mesh.

19. A system as described in claim 18, the operations further comprising generating a new pose for the graphic object of the multi-state symbol by deforming the deformed triangular mesh in response to receiving input at the additional graphic manipulation handle and embedding an additional final position vector that describes the new pose in the multi-state symbol.

20. A system as described in claim 16, the operations further comprising generating an interpolated pose for the graphic object of the multi-state symbol by determining barycentric coordinates of graphic manipulation handles of the interpolated pose using an interpolation value for transitioning between the rest position vector and the final position vector and mapping the outline and the triangular base mesh to the barycentric coordinates of the graphic manipulation handles of the interpolated pose.

* * * * *